(12) United States Patent
Fujisaki et al.

(10) Patent No.: US 8,605,365 B2
(45) Date of Patent: Dec. 10, 2013

(54) ZOOM LENS SYSTEM

(75) Inventors: Junichi Fujisaki, Saitama (JP); Takashi Enomoto, Chiba (JP); Tomoya Koga, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 123 days.

(21) Appl. No.: 13/391,668

(22) PCT Filed: Aug. 13, 2010

(86) PCT No.: PCT/JP2010/063761
§ 371 (c)(1),
(2), (4) Date: Feb. 22, 2012

(87) PCT Pub. No.: WO2011/024657
PCT Pub. Date: Mar. 3, 2011

(65) Prior Publication Data
US 2012/0147480 A1 Jun. 14, 2012

(30) Foreign Application Priority Data

Aug. 28, 2009 (JP) ................................ 2009-198171

(51) Int. Cl.
*G02B 15/14* (2006.01)
(52) U.S. Cl.
USPC ....................................................... 359/691
(58) Field of Classification Search
USPC ....................................................... 359/691
See application file for complete search history.

(56) References Cited

U.S. PATENT DOCUMENTS

| | | |
|---|---|---|
| 6,989,941 B2 | 1/2006 | Tomioka |
| 7,046,454 B2 | 5/2006 | Tomioka |
| 7,050,240 B2 | 5/2006 | Tomioka |
| 2002/0176177 A1 | 11/2002 | Takatsuki |
| 2004/0184161 A1 | 9/2004 | Takatsuki |
| 2004/0207929 A1 | 10/2004 | Tomioka |
| 2005/0078380 A1 | 4/2005 | Tomioka |
| 2006/0077565 A1 | 4/2006 | Tomioka |
| 2010/0039710 A1 | 2/2010 | Wei |

FOREIGN PATENT DOCUMENTS

| | | |
|---|---|---|
| JP | 2002-277737 | 9/2002 |
| JP | 2004-212913 | 7/2004 |
| JP | 2004-317901 | 11/2004 |
| JP | 2005-134887 | 5/2005 |
| JP | 2006-091643 | 4/2006 |
| JP | 2008-065051 | 3/2008 |
| JP | 2010-044235 | 2/2010 |

OTHER PUBLICATIONS

International Search Report from WIPO, English language translation, mail date is Nov. 2, 2010.

*Primary Examiner* — William Choi
(74) *Attorney, Agent, or Firm* — Greenblum & Bernstein P.L.C.

(57) ABSTRACT

The objective of the present invention is to provide a zoom lens system having an f-number of approximately 1.3 at the wide extremity, a half angle-of-view of 75 degrees, and a zoom ratio of approximately 3:1. The solution to this objective is to provide a zoom lens system including a first lens group, having a negative refractive power, a diaphragm, and a second lens group, having a positive refractive power, in that order from the object side; wherein the first lens group and the second lens group move in the optical axis direction so that the distance therebetween decreases upon zooming from the wide-angle extremity to the telephoto extremity.

10 Claims, 21 Drawing Sheets

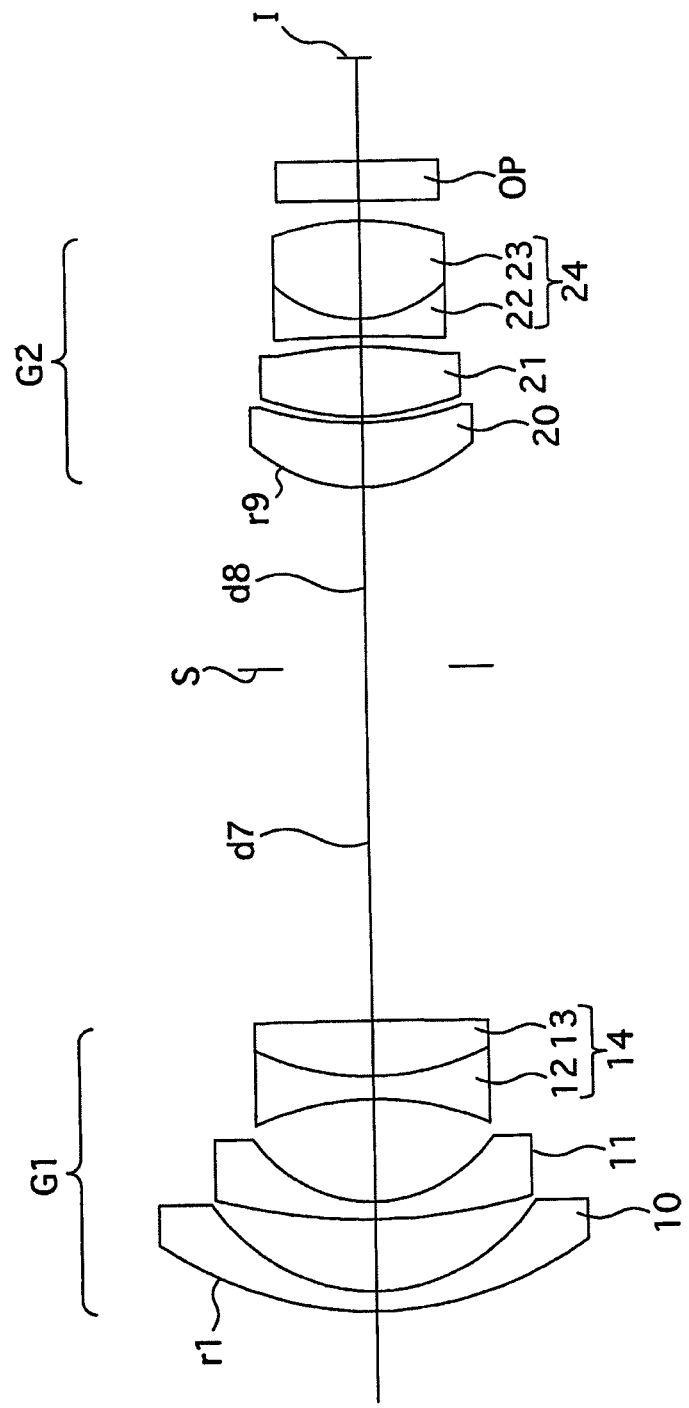

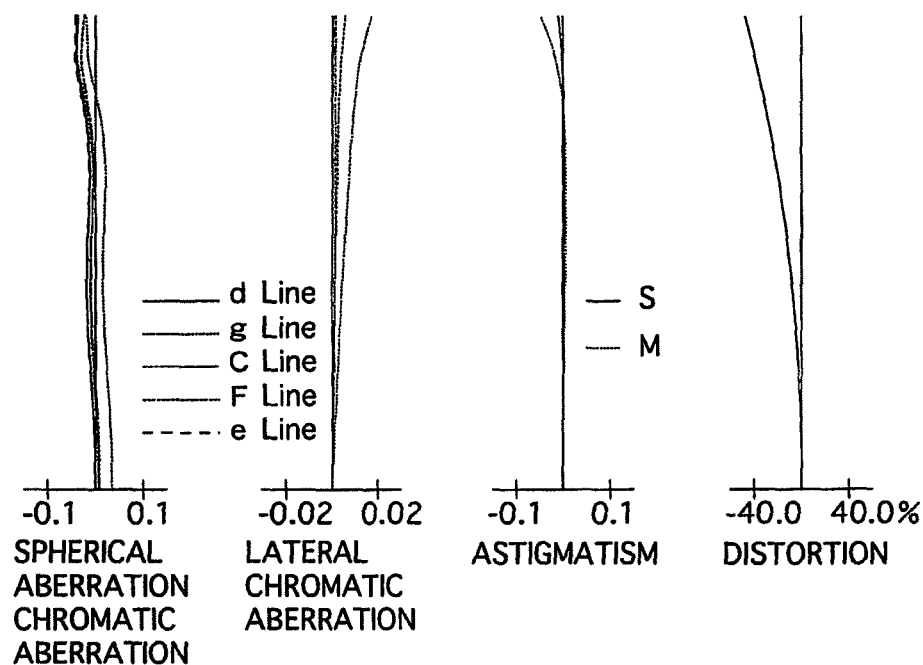
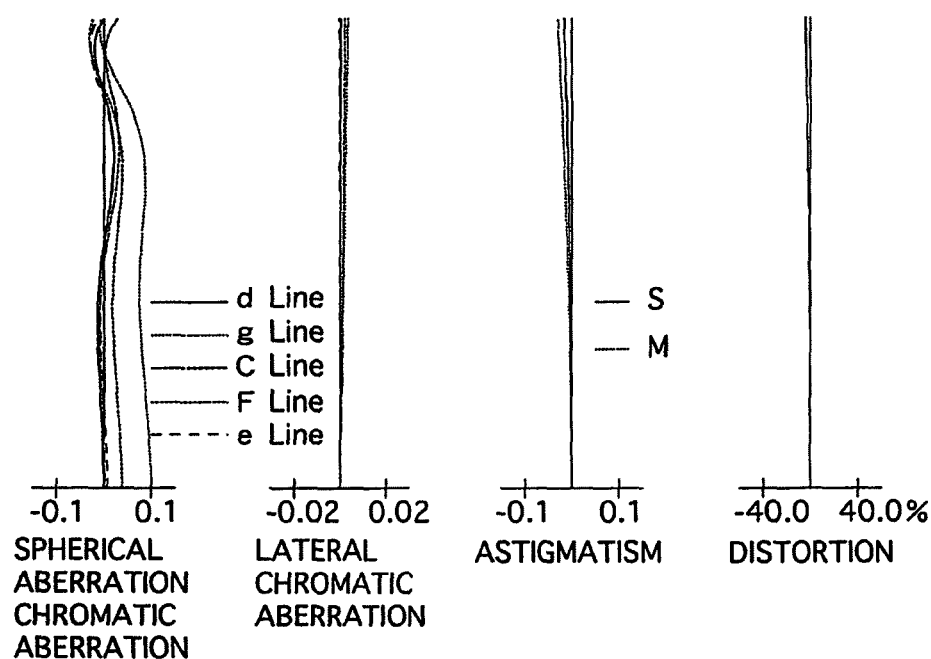

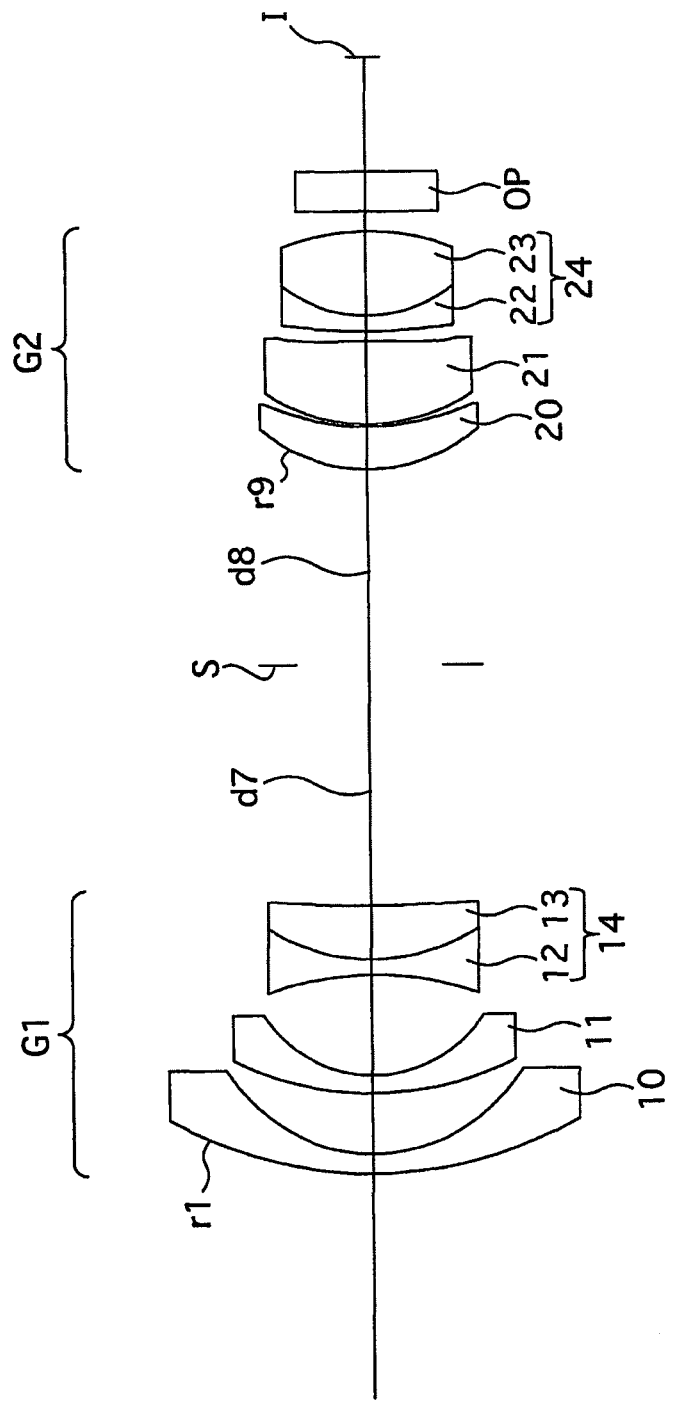

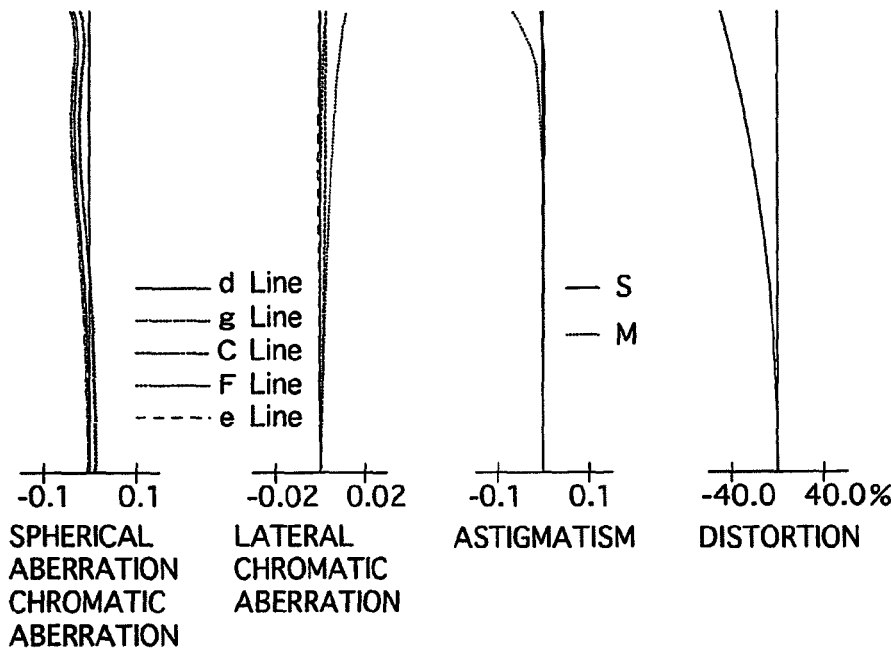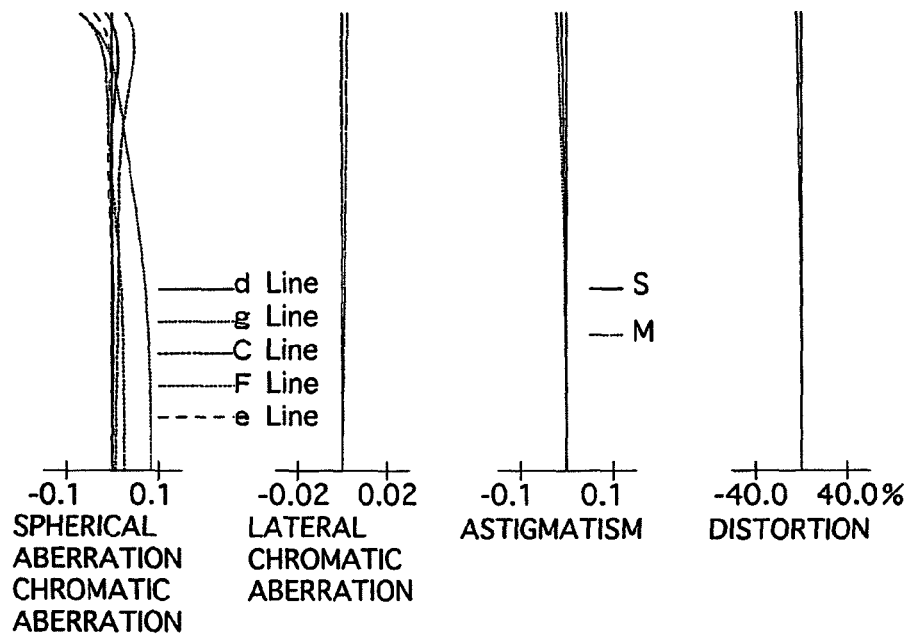

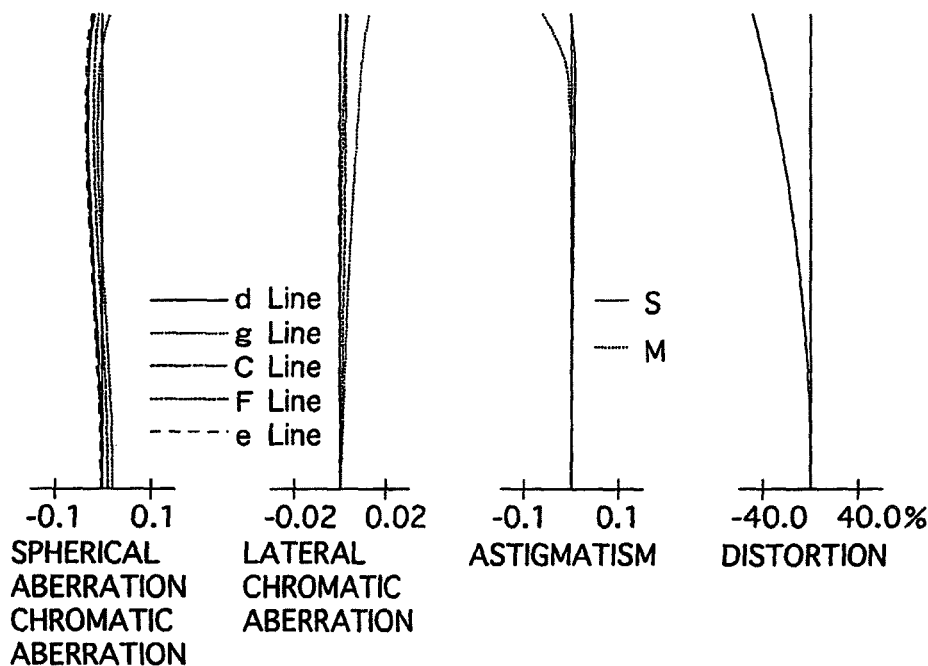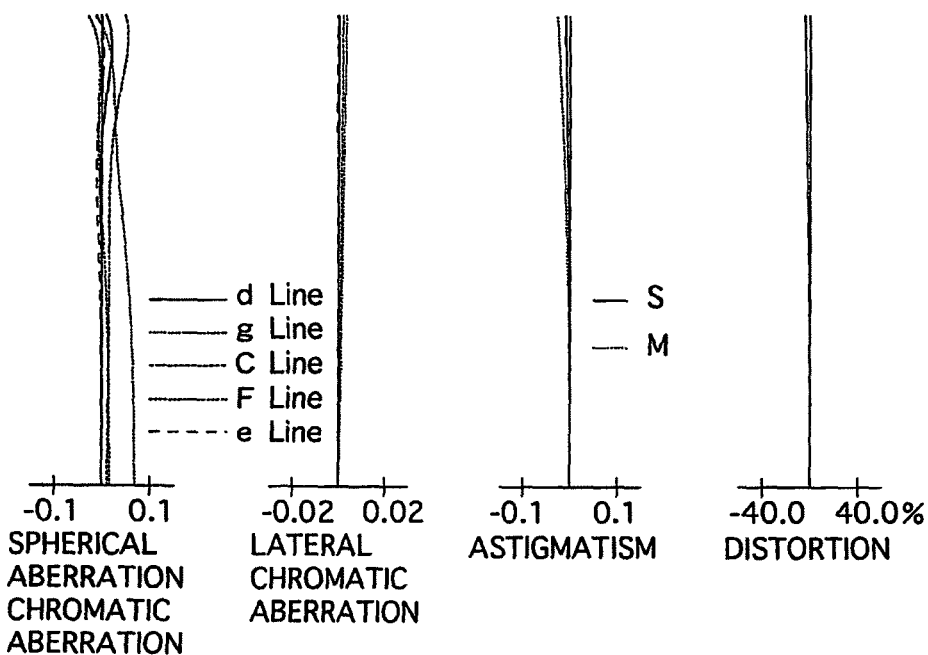

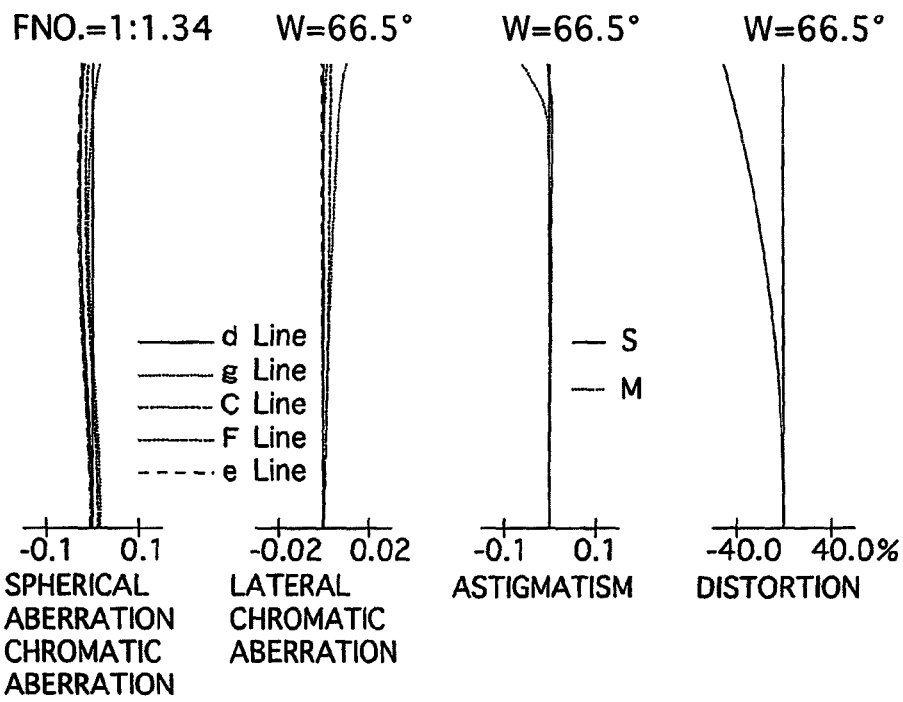
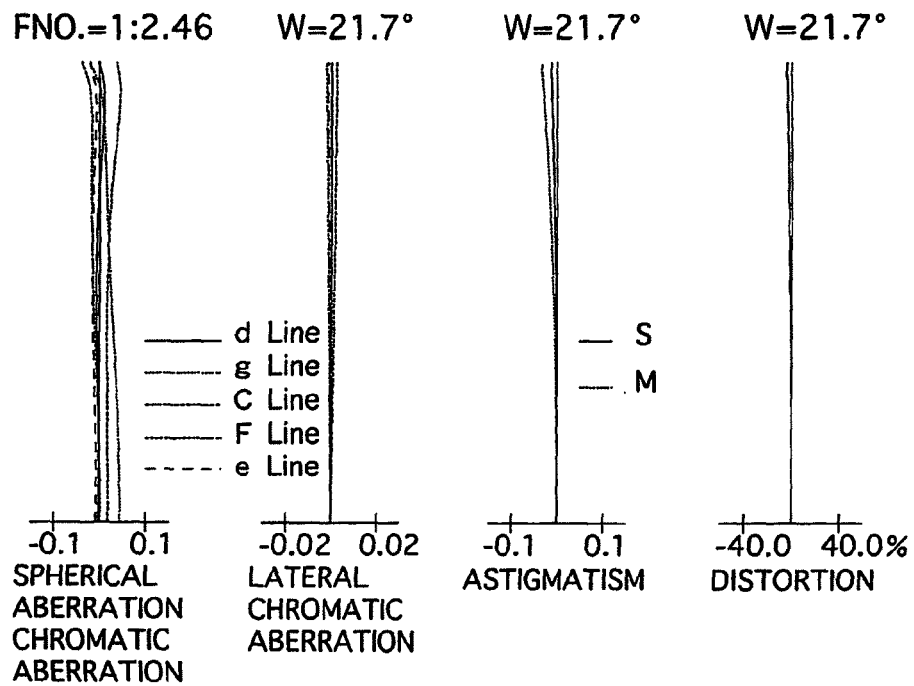

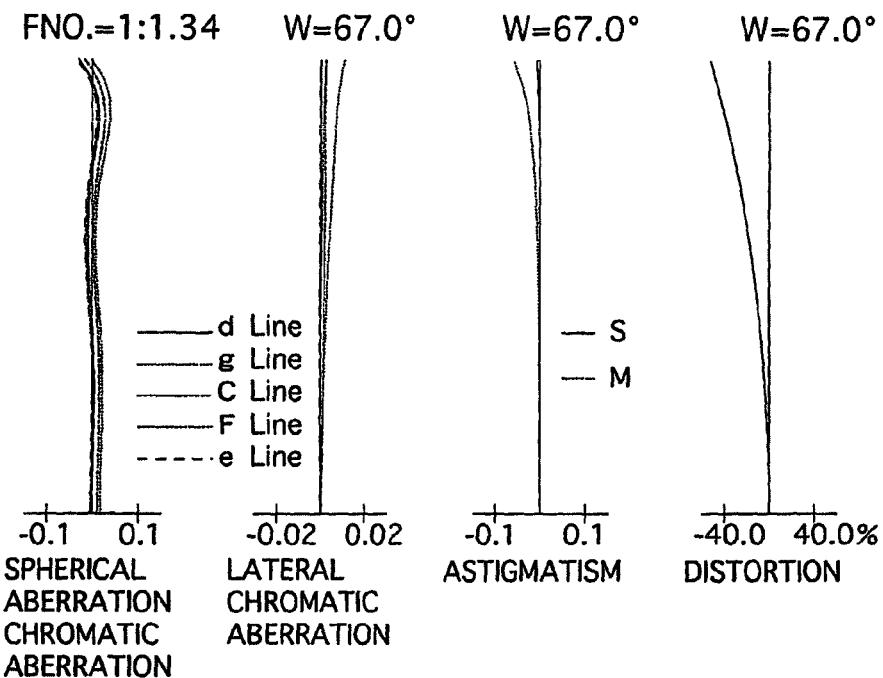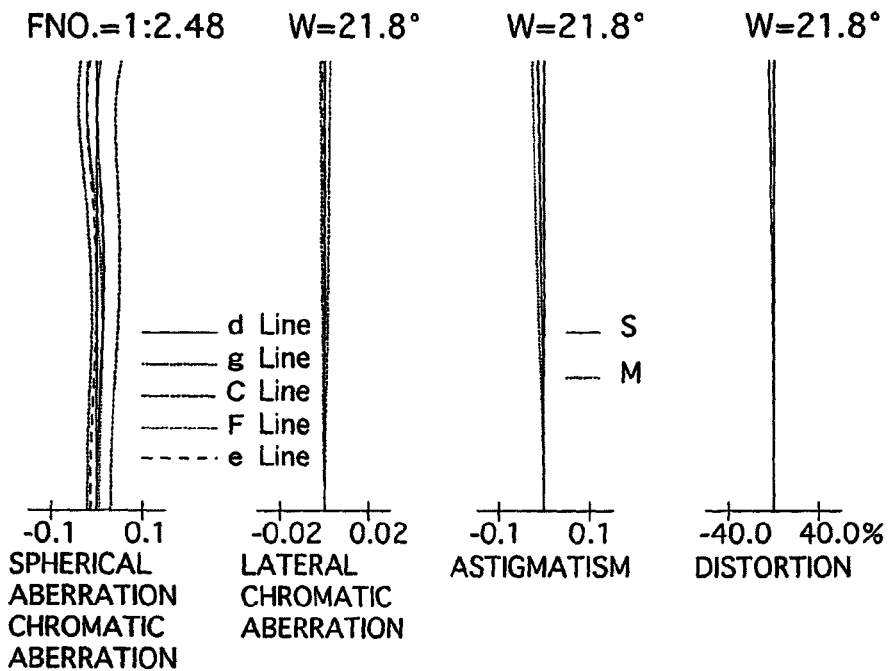

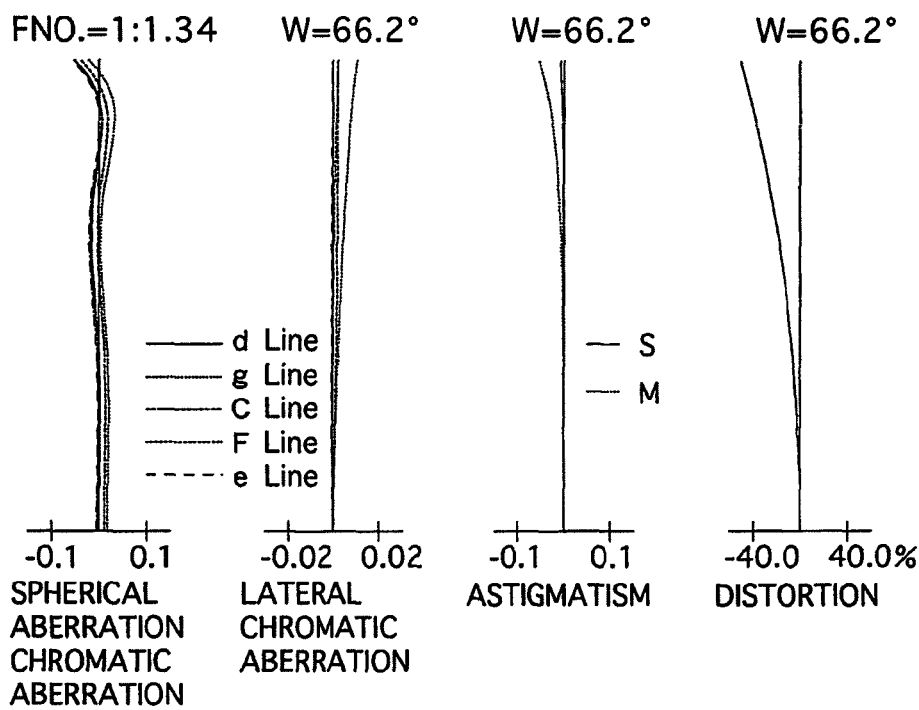
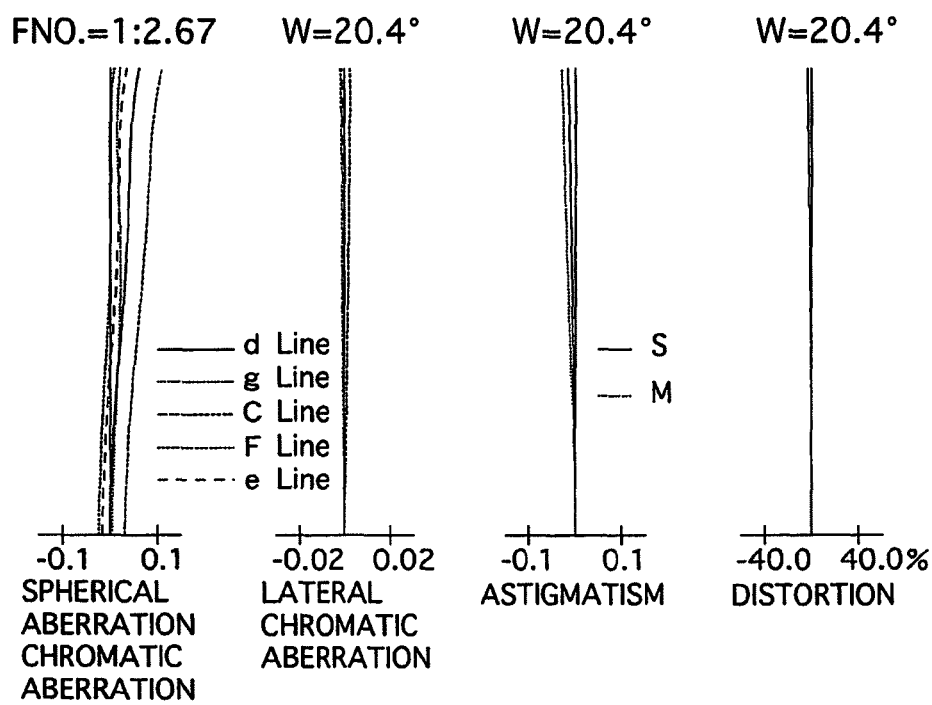

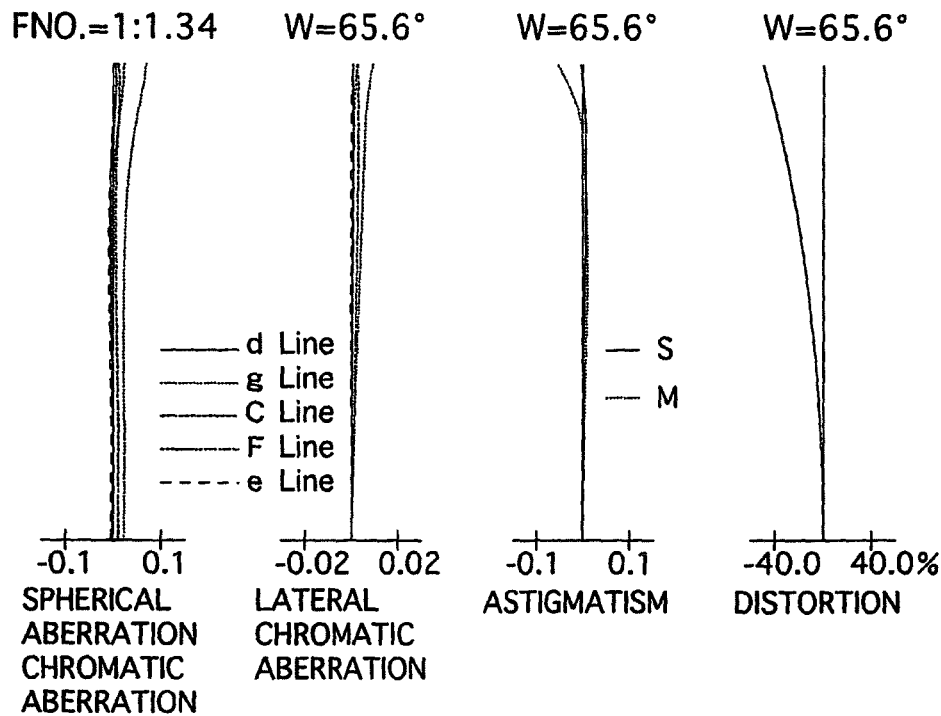
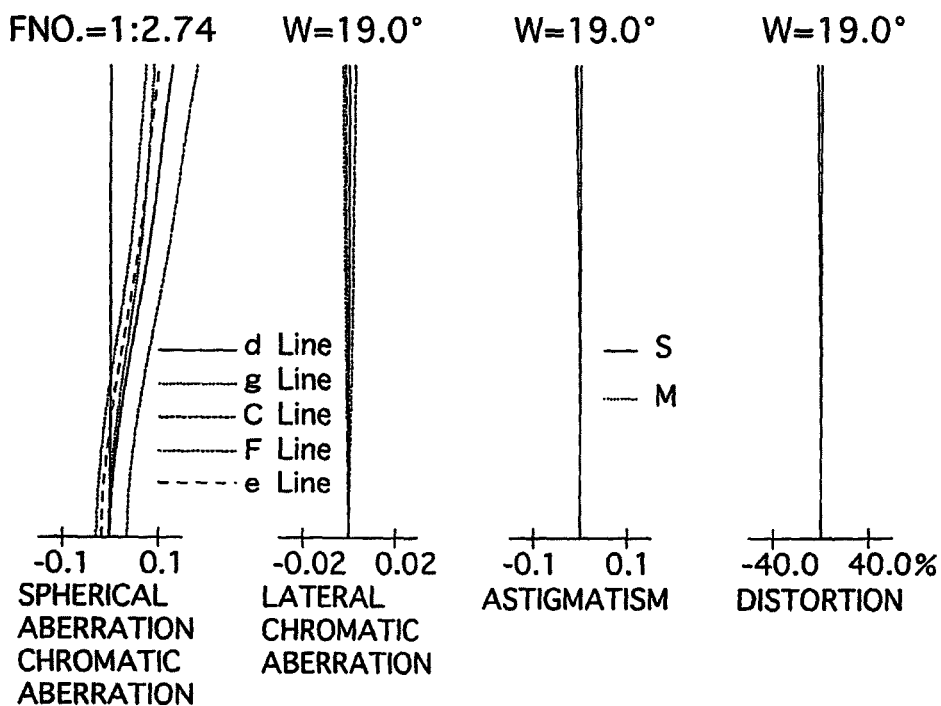

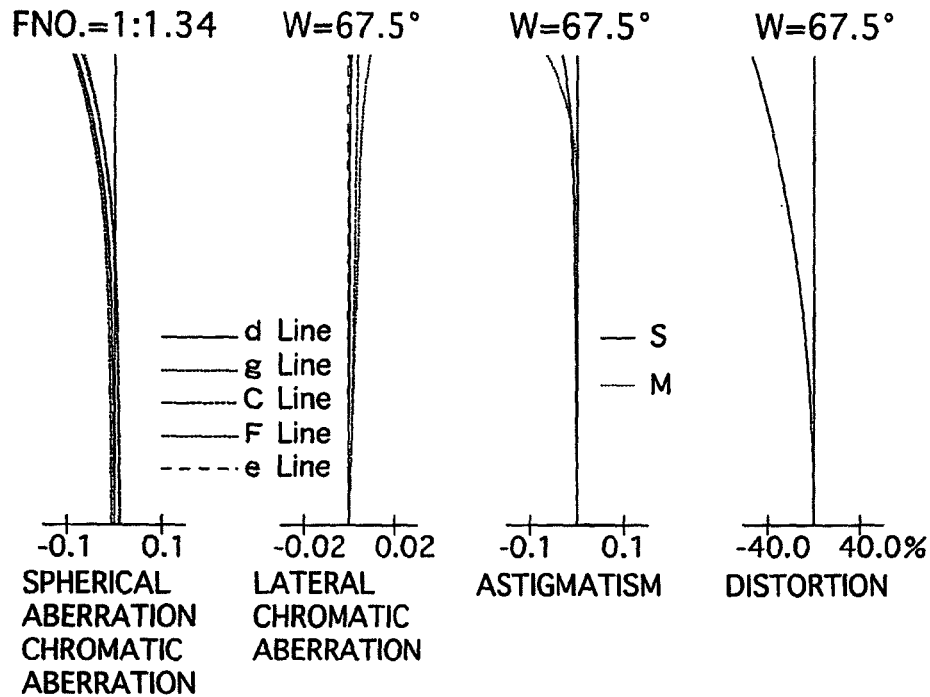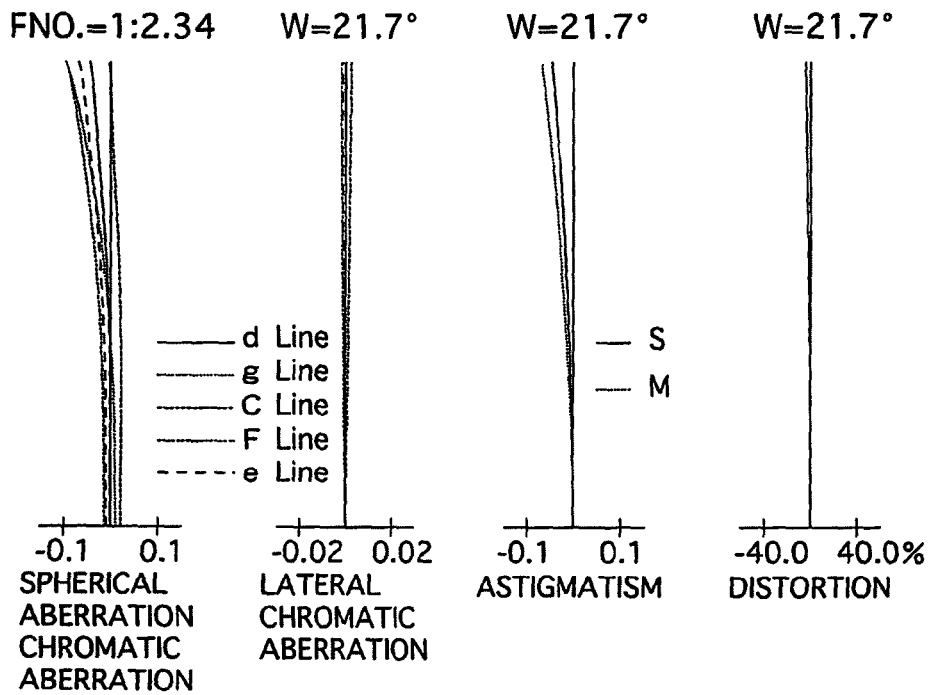

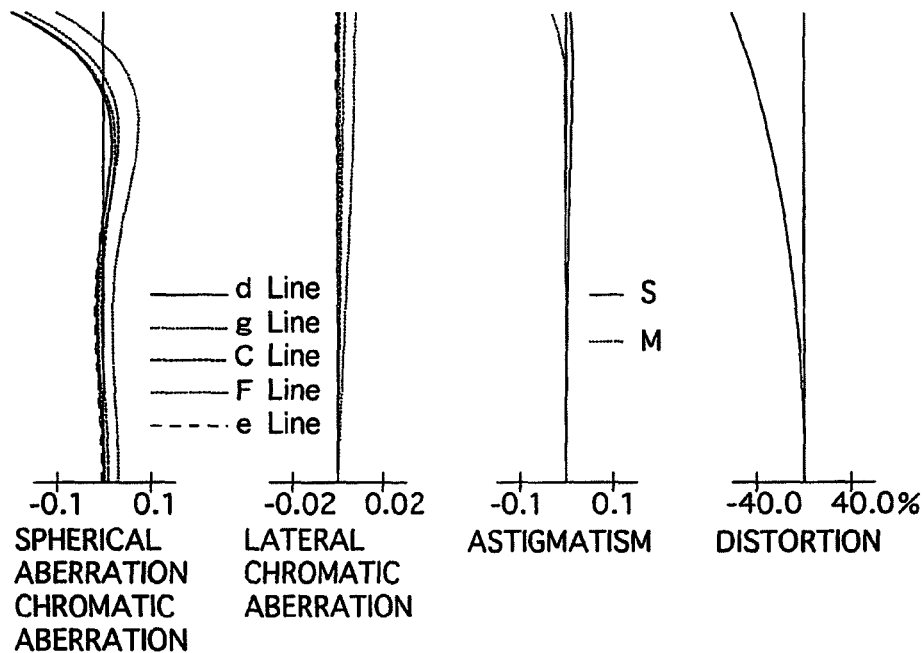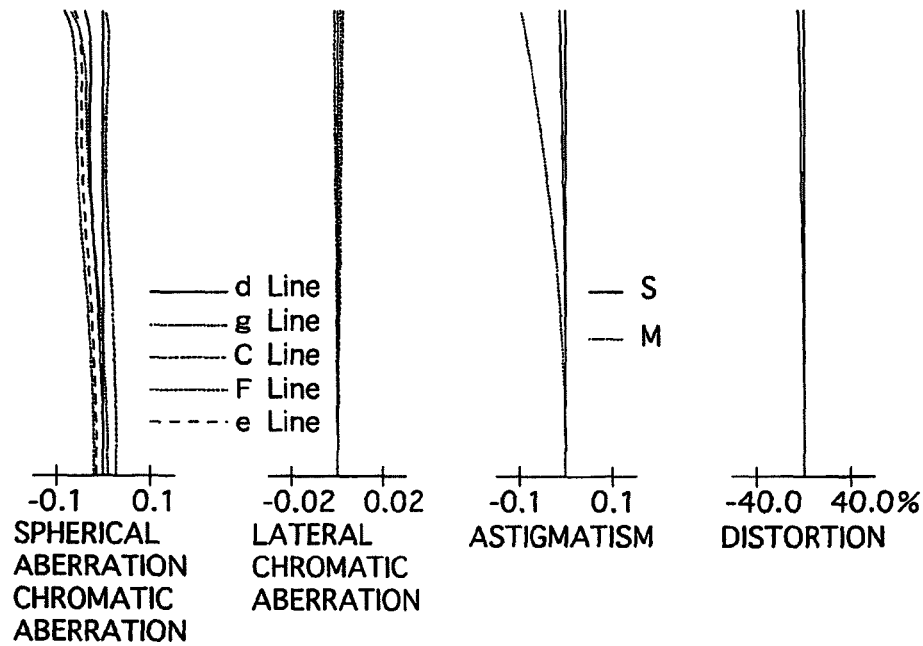

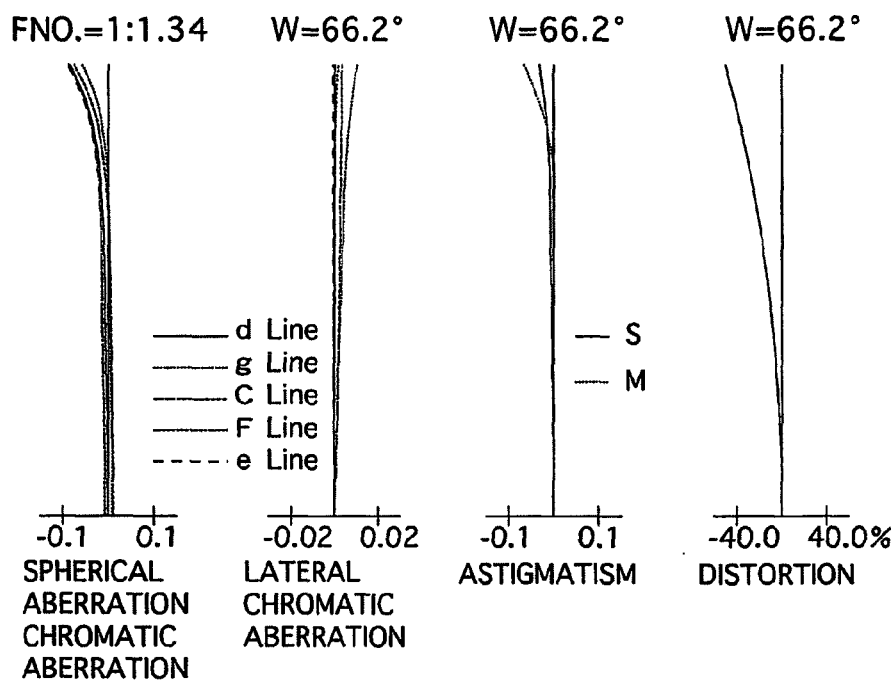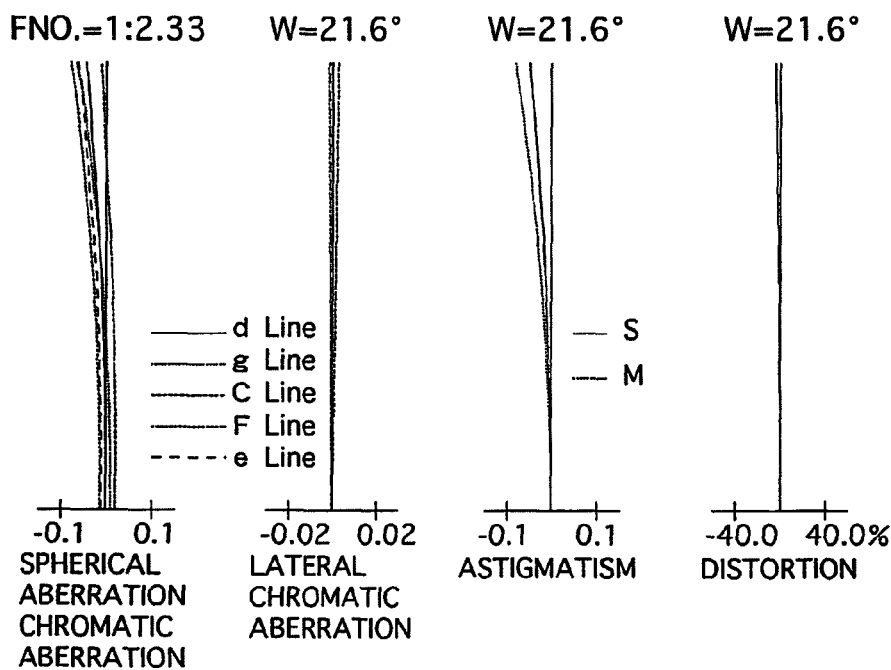

ZOOM LENS SYSTEM

TECHNICAL FIELD

The present invention relates to a zoom lens system used in video cameras and electronic still cameras, etc., in which an imaging sensor such as a CCD or a CMOS is used, and particularly relates to a zoom lens system used in a surveillance camera.

BACKGROUND ART

The demand for compact-sized surveillance cameras in offices and inside train stations is increasing. Until now, low-pixel cameras have been common, so that lenses that are adopted for low pixelization, such as VGA, etc., and a half angle-of-view of approximately 60 degrees at the short focal length extremity have become predominant.

CITATION LIST

Patent Literature

Patent Literature 1: Japanese Unexamined Patent Application No. 2002-277737
Patent Literature 2: Japanese Unexamined Patent Application No. 2004-212913
Patent Literature 3: Japanese Unexamined Patent Application No. 2004-317901
Patent Literature 4: Japanese Unexamined Patent Application No. 2005-134887
Patent Literature 5: Japanese Unexamined Patent Application No. 2006-91643
Patent Literature 6: Japanese Unexamined Patent

SUMMARY OF INVENTION

Technical Problem

However, in recent years, since a resolution that can practically cope with a wider range of photography has become possible as cameras that are adapted for megapixels have become commonplace, the demand has become higher for photographic lenses to have a wider angle-of-view and to be adaptable for high pixelization (higher optical quality). Usually, in order to suppress extreme enlargement, zoom lens systems having a half angle-of-view of 65 degrees at the short focal length extremity have a zoom ratio of approximately 2:1, and zoom lens systems having a zoom ratio of approximately 3:1 and having a half angle-of-view of 60 degrees are common; however, it was difficult to achieve both a high zoom ratio and a wide angle-of-view.

The present invention provides a zoom lens system that has a fast f-number of approximately 1.3 at the short focal length extremity, has a wide half angle-of-view of approximately 75 degrees, can achieve a high zoom ratio of approximately 3:1, and is adaptable for high pixelization.

Solution To Problem

A zoom lens system of the present invention is characterized by a zoom lens system comprising a first lens group, having a negative refractive power, a diaphragm, and a second lens group, having a positive refractive power, in that order from the object; wherein the first lens group and the second lens group move in the optical axis direction so that the distance between the first lens group and the second lens group decreases upon zooming from the short focal length extremity to the long focal length extremity, wherein the first lens group includes a negative lens element, a negative lens element, a negative lens element, and a positive lens element, in that order from the object, wherein the second lens group includes a positive lens element, a positive lens element, a negative lens element, and a positive lens element, in that order from the object, and wherein the following conditions are satisfied:

$$4.8 < \Sigma 1G/fw < 6.0 \quad (1)$$

$$2.8 < \Delta X2G/fw < 4.0 \quad (2)$$

wherein $\Sigma 1G$ designates the distance on the optical axis from the most object-side surface of the first lens group to the most image-side surface thereof, fw designates the focal length of the entire zoom lens system at the short focal length extremity, and $\Delta X2G$ designates the traveling distance of the second lens group when zooming between the short focal length extremity and the long focal length extremity is performed.

It is desirable for the zoom lens system of the present invention to satisfy the following condition:

$$0.5 < |f1G/f2G| < 0.8 \quad (3)$$

wherein f1G designates the focal length of the first lens group, and
f2G designates the focal length of the second lens group.

It is practical for the diaphragm to be provided at a stationary position on the optical axis, and for the distance from the diaphragm to the imaging plane not to change during zooming.

In the case where the negative third lens element, counted from the object, of the first lens group and the positive fourth lens element, counted from the object, of the first lens group constitute a cemented lens, it is desirable for the following condition to be satisfied:

$$25 < \nu N1G - \nu P1G \quad (4)$$

wherein $\nu N1G$ designates the Abbe number with respect to the d-line of the negative lens element in the cemented lens of the first lens group, and $\nu P1G$ designates the Abbe number with respect to the d-line of the positive lens element in the cemented lens of the first lens group.

In the case where the negative third lens element, counted from the object, of the second lens group and the positive fourth lens element, counted from the object, of the second lens group constitute a cemented lens, it is desirable for the following condition is satisfied:

$$25 < \nu P2G - \nu N2G \quad (5)$$

wherein $\nu P2G$ designates the Abbe number with respect to the d-line of the positive lens element in the cemented lens of the second lens group, and $\nu N2G$ designates the Abbe number with respect to the d-line of the negative lens element in the cemented lens of the second lens group.

In another embodiment, a zoom lens system of the present invention is characterized by a zoom lens system comprising a first lens group, having a negative refractive power, a diaphragm, and a second lens group, having a positive refractive power, in that order from the object; wherein the first lens group and the second lens group move in the optical axis direction so that the distance between the first lens group and the second lens group decreases upon zooming from the short focal length extremity to the long focal length extremity, wherein the first lens group includes a negative lens element, a negative lens element, a negative lens element, and a positive lens element, in that order from the object, wherein the second lens group includes a positive lens element, a positive lens element, a negative lens element, and a positive lens element, in that order from the object, and wherein the following conditions are satisfied:

$$4.8 < \Sigma 1G/fw < 6.0 \quad (1)$$

$$2.2 < \Delta x2G/(ft/fw) < 3.2 \quad (6)$$

wherein $\Sigma 1G$ designates the distance on the optical axis from the most object-side surface of the first lens group to the most image-side surface thereof, fw designates the focal length (mm) of the entire zoom lens system at the short focal length extremity, $\Delta X2G$ designates the traveling distance (mm) of the second lens group when zooming between the short focal length extremity and the long focal length extremity is performed, and ft designates the focal length (mm) of the entire zoom lens system at the long focal length extremity.

Also in this embodiment of the zoom lens system, it is desirable for the zoom lens system of the present invention to satisfy the following condition:

$$0.5 < |f1G/f2G| < 0.8 \quad (3)$$

wherein f1G designates the focal length of the first lens group, and
f2G designates the focal length of the second lens group.

Also in this embodiment of the zoom lens system, it is practical for the diaphragm to be provided at a stationary position on the optical axis, and for the distance from the diaphragm to the imaging plane not to change during zooming.

Further, in this embodiment of the zoom lens system, in the case where the negative third lens element, counted from the object, of the first lens group and the positive fourth lens element, counted from the object, of the first lens group constitute a cemented lens, it is desirable for the following condition to be satisfied:

$$25 < vN1G - vP1G \quad (4)$$

wherein vN1G designates the Abbe number with respect to the d-line of the negative lens element in the cemented lens of the first lens group, and vP1G designates the Abbe number with respect to the d-line of the positive lens element in the cemented lens of the first lens group.

Also in this embodiment of the zoom lens system, in the case where the negative third lens element, counted from the object, of the second lens group and the positive fourth lens element, counted from the object of, the second lens group constitute a cemented lens, it is desirable for the following condition is satisfied:

$$25 < vP2G - vN2G \quad (5)$$

wherein vP2G designates the Abbe number with respect to the d-line of the positive lens element in the cemented lens of the second lens group, and vN2G designates the Abbe number with respect to the d-line of the negative lens element in the cemented lens of the second lens group.

Advantageous Effects of Invention

According to the present invention, a zoom lens system can be provided that has a fast f-number of approximately 1.3 at the short focal length extremity, has a wide half angle-of-view of approximately 75 degrees, can achieve a high zoom ratio of approximately 3:1, and is adaptable for high pixelization.

BRIEF DESCRIPTION OF DRAWINGS

FIG. 1 is a lens arrangement of a first numerical embodiment of a zoom lens system according to the present invention.

FIGS. 2A, 2B, 2C, and 2D show various aberration diagrams of the zoom lens system of FIG. 1 when focusing on an object at infinity at the short focal length extremity.

FIGS. 3A, 3B, 3C, and 3D show various aberration diagrams of the zoom lens system of FIG. 1 when focusing on an object at infinity at the long focal length extremity.

FIG. 4 is a lens arrangement of a second numerical embodiment of a zoom lens system according to the present invention.

FIGS. 5A, 5B, 5C, and 5D, show various aberration diagrams of the zoom lens system of FIG. 4 when focusing on an object at infinity at the short focal length extremity.

FIGS. 6A, 6B, 6C, and 6D, show various aberration diagrams of the zoom lens system of FIG. 4 when focusing on an object at infinity at the long focal length extremity.

FIGS. 8A, 8B, 8C, and 8D show various aberration diagrams of the zoom lens system of FIG. 7 when focusing on an object at infinity at the short focal length extremity.

FIGS. 9A, 9B, 9C, and 9D show various aberration diagrams of the zoom lens system of FIG. 7 when focusing on an object at infinity at the long focal length extremity.

FIGS. 11A, 11B, 11C, and 11D show various aberration diagrams of the zoom lens system of FIG. 10 when focusing on an object at infinity at the short focal length extremity.

FIGS. 12A, 12B, 12C, and 12D show various aberration diagrams of the zoom lens system of FIG. 10 when focusing on an object at infinity at the long focal length extremity.

FIGS. 14A, 14B, 14C, and 14D show various aberration diagrams of the zoom lens system of FIG. 13 when focusing on an object at infinity at the short focal length extremity.

FIGS. 15A, 15B, 15C, and 15D show various aberration diagrams of the zoom lens system of FIG. 13 when focusing on an object at infinity at the long focal length extremity.

FIGS. 17A, 17B, 17C, and 17D show various aberration diagrams of the zoom lens system of FIG. 16 when focusing on an object at infinity at the short focal length extremity.

FIGS. 18A, 18B, 18C, and 18D show various aberration diagrams of the zoom lens system of FIG. 16 when focusing on an object at infinity at the long focal length extremity.

FIGS. 20A, 20B, 20C, and 20D show various aberration diagrams of the zoom lens system of FIG. 19 when focusing on an object at infinity at the short focal length extremity.

FIGS. 21A, 21B, 21C, and 21D show various aberration diagrams of the zoom lens system of FIG. 19 when focusing on an object at infinity at the long focal length extremity.

FIGS. 23A, 23B, 23C, and 23D show various aberration diagrams of the zoom lens system of FIG. 22 when focusing on an object at infinity at the short focal length extremity.

FIGS. 24A, 24B, 24C, and 24D show various aberration diagrams of the zoom lens system of FIG. 22 when focusing on an object at infinity at the long focal length extremity.

FIGS. 26A, 26B, 26C, and 26D show various aberration diagrams of the zoom lens system of FIG. 25 when focusing on an object at infinity at the short focal length extremity.

FIGS. 27A, 27B, 27C, and 27D show various aberration diagrams of the zoom lens system of FIG. 25 when focusing on an object at infinity at the long focal length extremity.

FIGS. 29A, 29B, 29C, and 29D show various aberration diagrams of the zoom lens system of FIG. 28 when focusing on an object at infinity at the short focal length extremity.

FIG. 30A, 30B, 30C, and 30D show various aberration diagrams of the zoom lens system of FIG. 28 when focusing on an object at infinity at the long focal length extremity.

DESCRIPTION OF EMBODIMENTS

Figure 31:
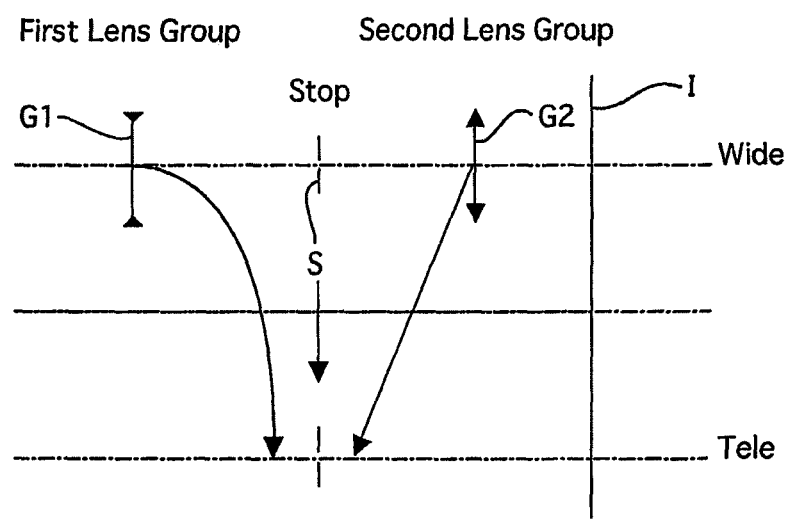
FIG. 31 is a simplified movement diagram of the movement path of the zoom lens system, according to the present invention.

The zoom lens system of the present embodiment is configured of a first lens group G1 having a negative refractive power, a diaphragm S, and a second lens group G2 having a positive refractive power, in that order from the object, as shown in the simplified movement diagram of FIG. 31.

In this zoom lens system, upon zooming from the short focal length extremity (wide-angle) to the long focal length extremity (Telephoto), the distance between the first lens group G1 and the second lens group G2 decreases, the first lens group G1 moves as a whole toward the image while plotting a convex movement path facing toward the image, and the second lens group G2 moves monotonically toward the object. The position of the diaphragm S on the optical axis is stationary so that the distance between the diaphragm S and an imaging plane I does not change. If the diaphragm S (diaphragm unit) is stationary, the distances between the diaphragm S and the first lens group G1 and between the diaphragm S and the second lens group G2 can both be enlarged (separated) at the short focal length extremity. Such an arrangement at the short focal length extremity is advantageous for the correcting of off-axis aberrations, which influences over to a wider angle-of-view.

Figure 7:
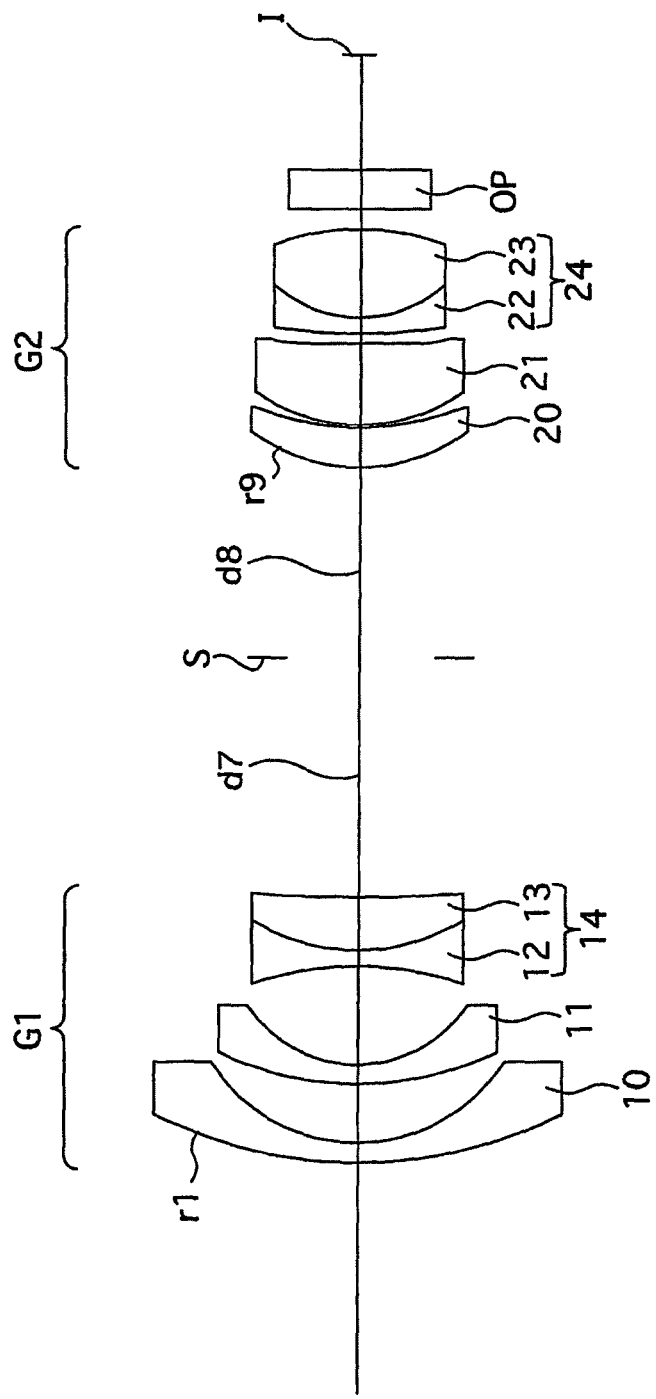
FIG. 7 is a lens arrangement of a third numerical embodiment of a zoom lens system according to the present invention.
Figure 10:
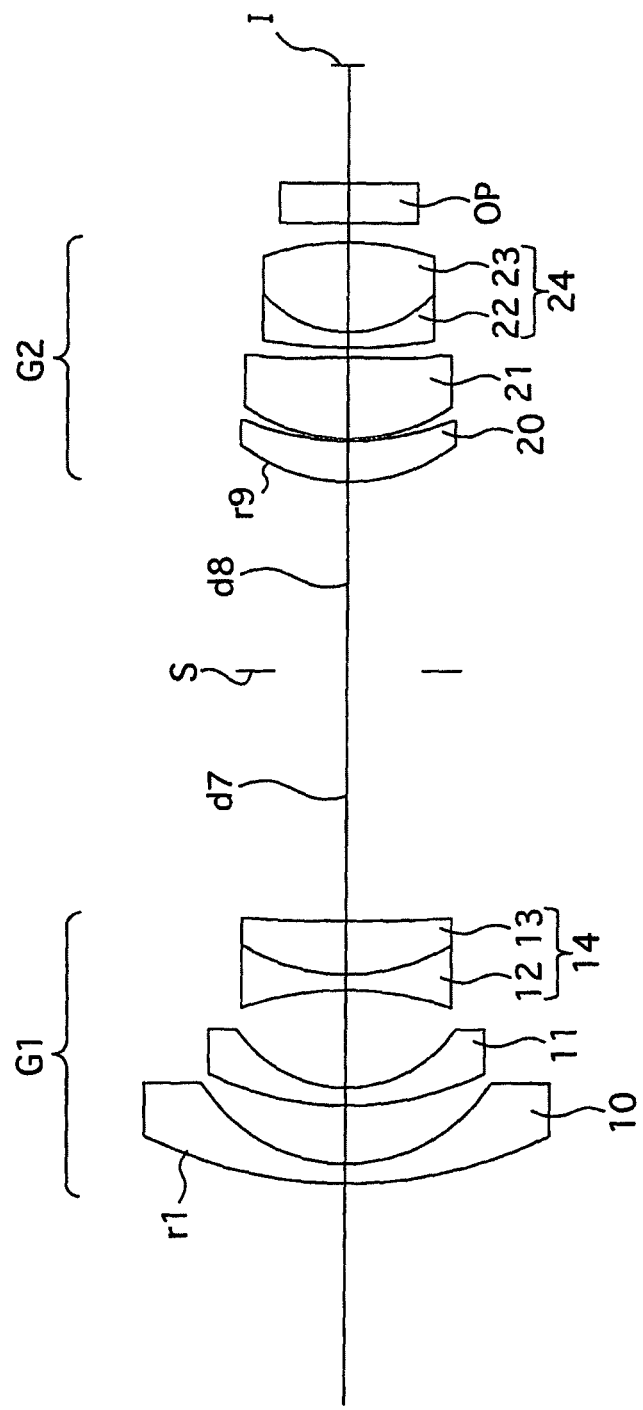
FIG. 10 is a lens arrangement of a fourth numerical embodiment of a zoom lens system according to the present invention.
Figure 13:
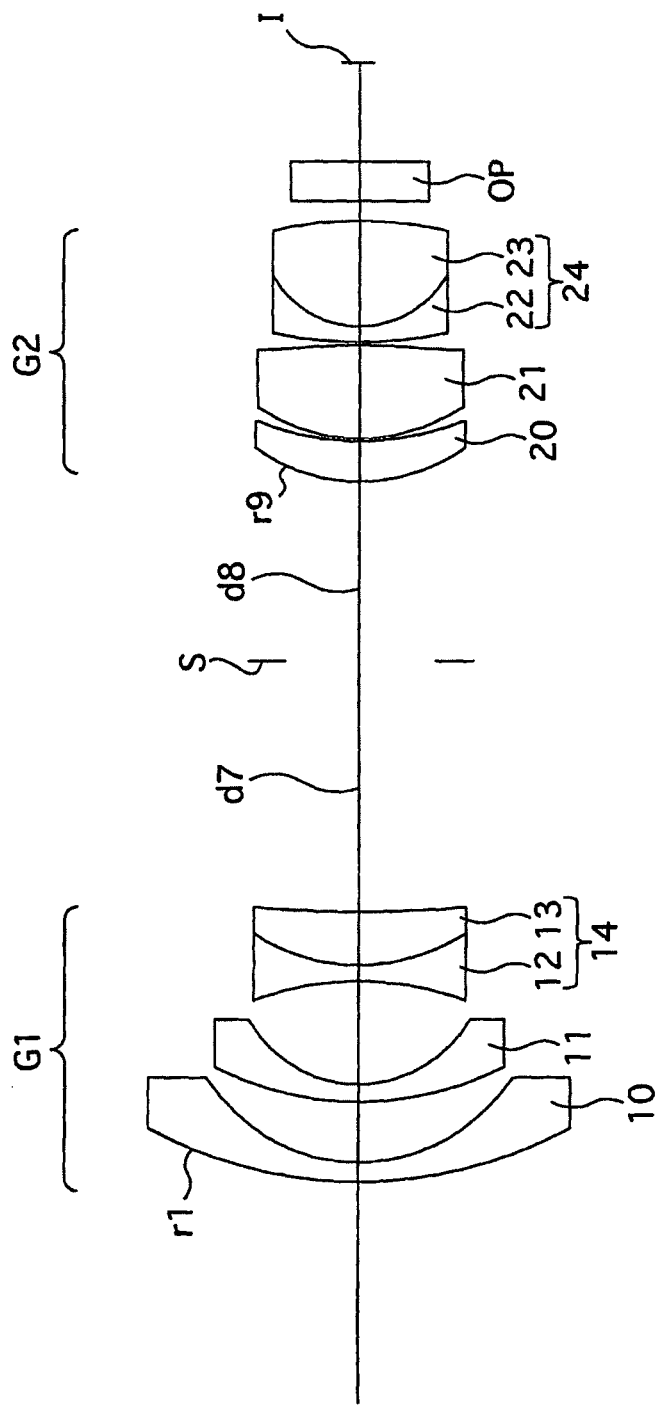
FIG. 13 is a lens arrangement of a fifth numerical embodiment of a zoom lens system according to the present invention.
Figure 16:
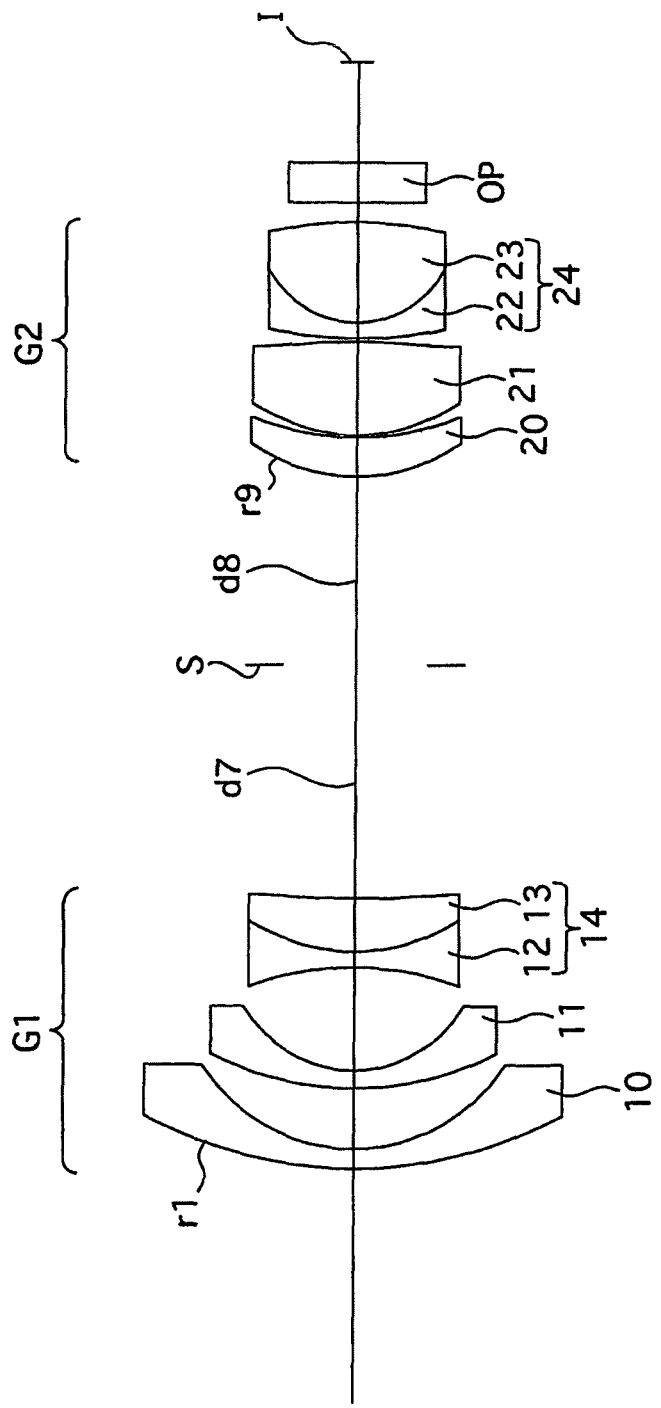
FIG. 16 is a lens arrangement of a sixth numerical embodiment of a zoom lens system according to the present invention.
Figure 19:
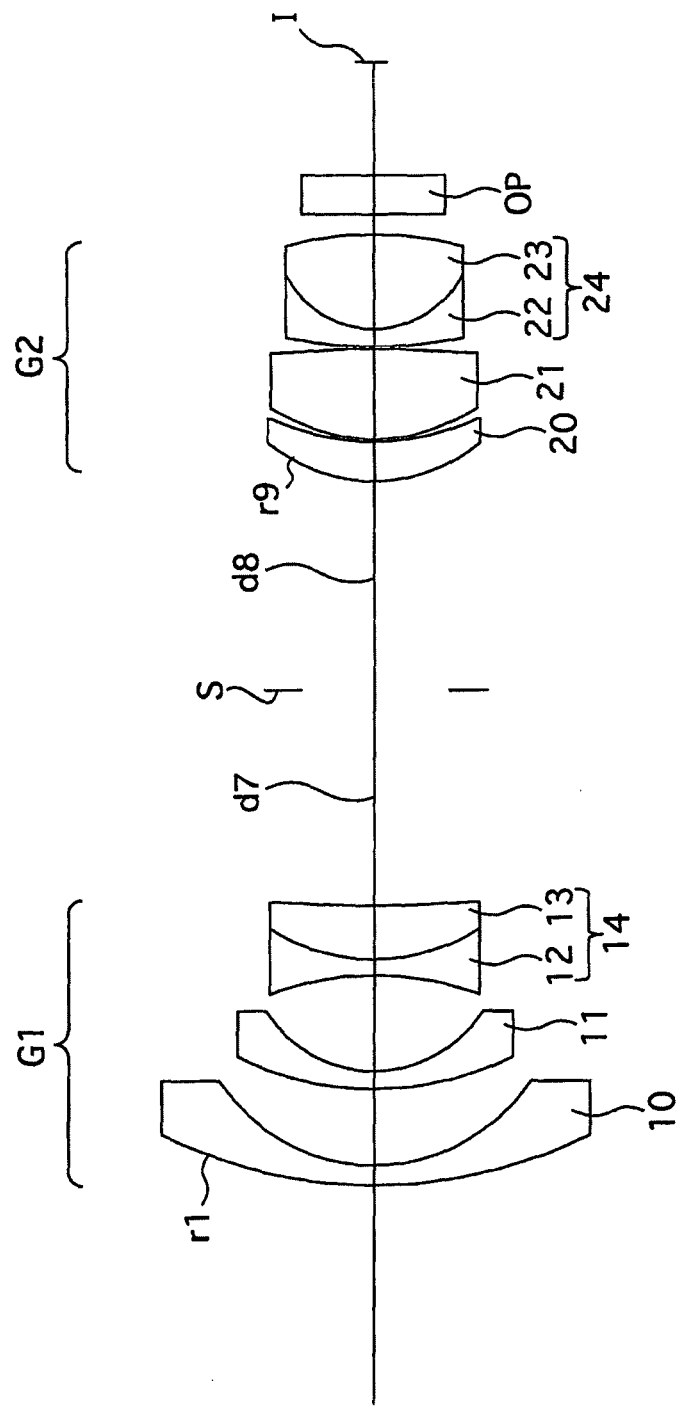
FIG. 19 is a lens arrangement of a seventh numerical embodiment of a zoom lens system according to the present invention.
Figure 22:
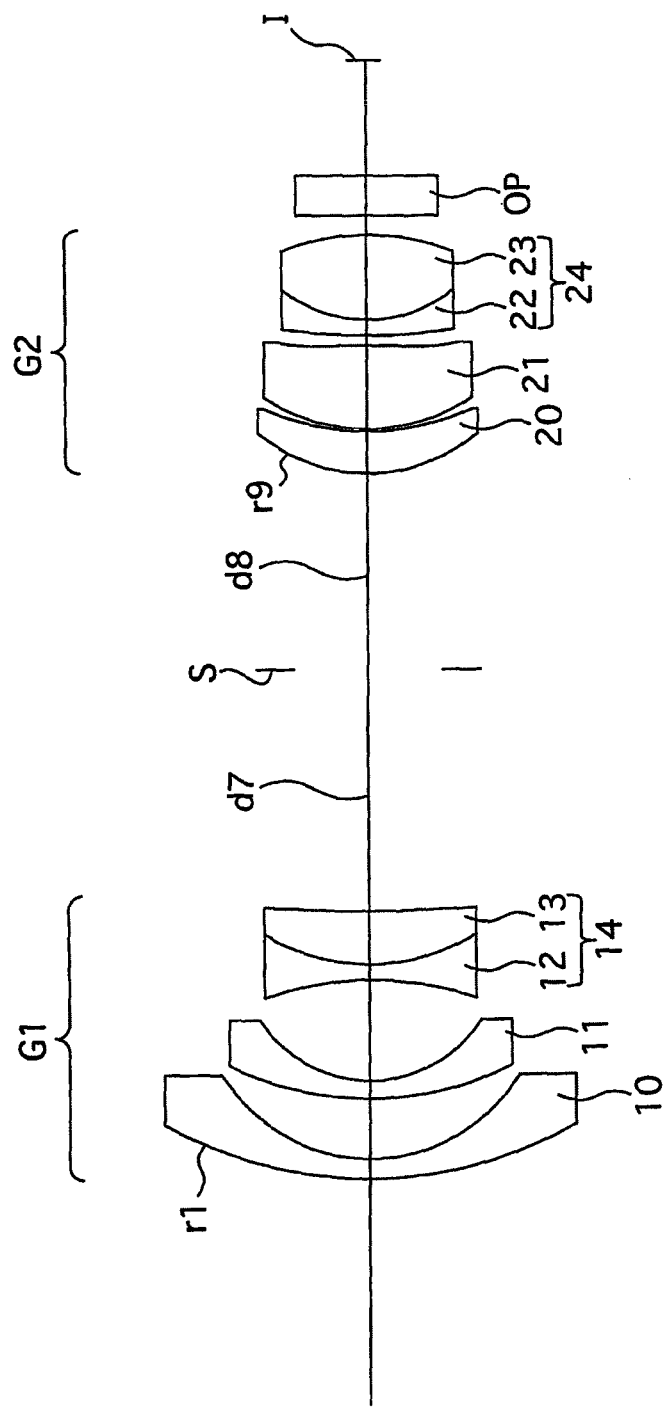
FIG. 22 is a lens arrangement of a eighth numerical embodiment of a zoom lens system according to the present invention.
Figure 25:
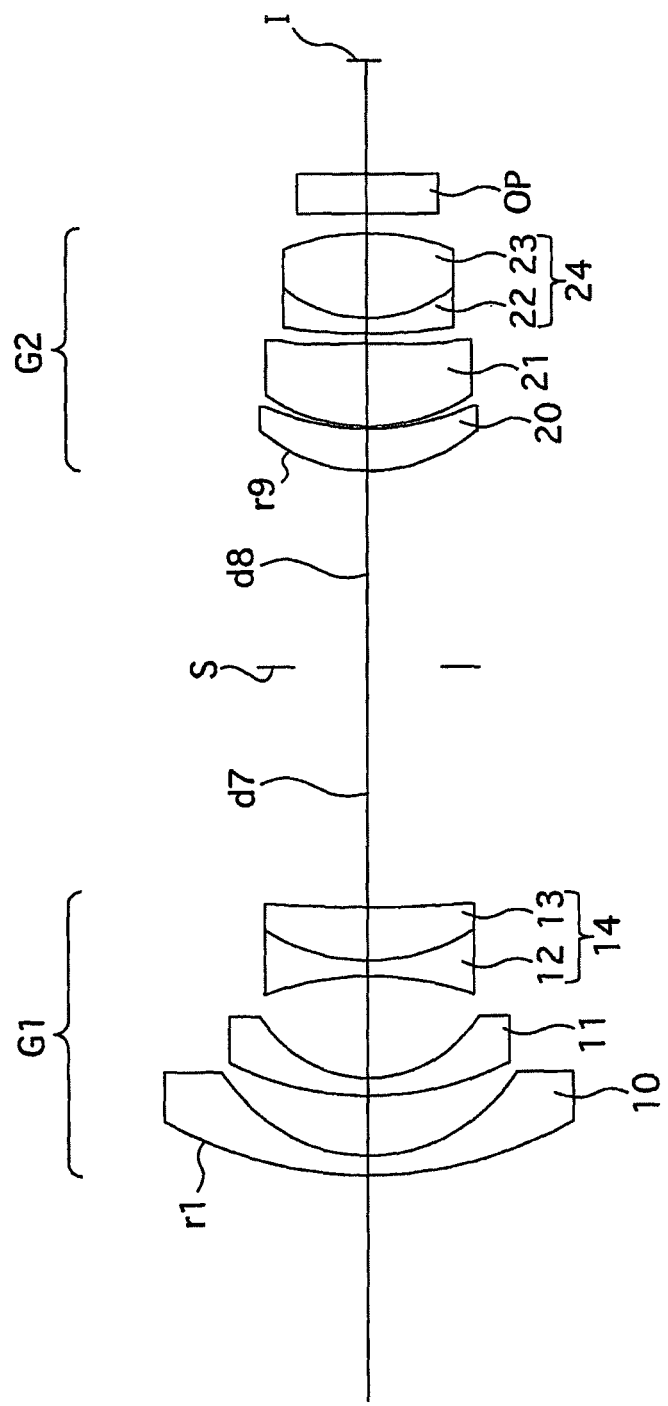
FIG. 25 is a lens arrangement of a ninth numerical embodiment of a zoom lens system according to the present invention.
Figure 28:
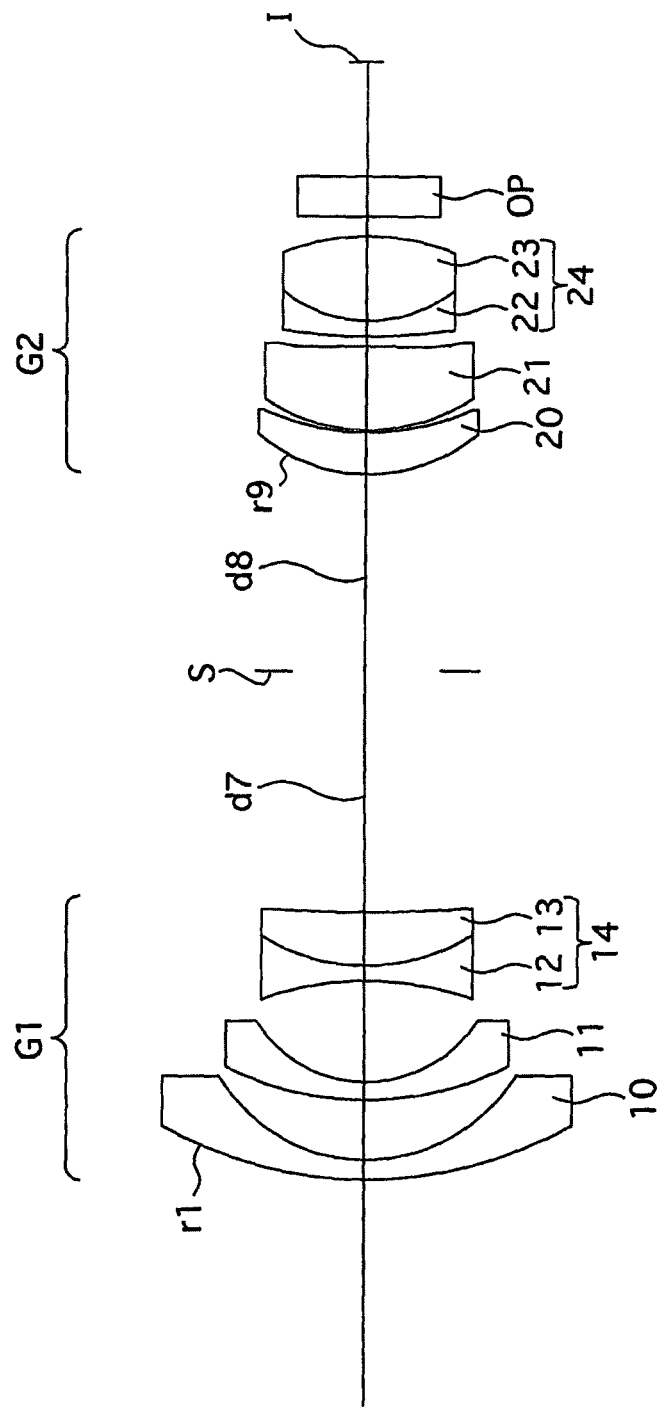
FIG. 28 is a lens arrangement of a tenth numerical embodiment of a zoom lens system according to the present invention.

The first lens group G1 is configured of a negative lens element 10, a negative lens element 11, a negative lens element 12 and a positive lens element 13, in that order from the object, as shown in FIG. 1 (first numerical embodiment), FIG. 4 (second numerical embodiment), FIG. 7 (third numerical embodiment), FIG. 10 (fourth numerical embodiment), FIG. 13 (fifth numerical embodiment), FIG. 16 (sixth numerical embodiment), FIG. 19 (seventh numerical embodiment), FIG. 22 (eighth numerical embodiment), FIG. 25 (ninth numerical embodiment) and FIG. 28 (tenth numerical embodiment). In each numerical embodiment, the negative lens element 12 and the positive lens element 13 constitute a cemented lens 14.

In each of the first through tenth numerical embodiments, the negative lens elements 10 and 11 are both negative meniscus lens elements having the convex surface facing toward the object.

In the first numerical embodiment, the negative lens element 12 on the object side and the positive lens element 13 on the image side of the cemented lens 14 are a biconcave negative lens element 12 and the biconvex positive lens element 13, and in the second through tenth embodiments, are a biconcave negative lens element 12 and a positive meniscus lens element 13 having the convex surface facing toward the object.

In each numerical embodiment, the second lens group G2 is configured of a positive lens element 20, a positive lens element 21, a negative lens element 22 and a positive lens element 23, in that order from the object. In each of the numerical embodiments, the negative lens element 22 and the positive lens element 23 constitute a cemented lens 24. The positive lens element 20, in each of the first through tenth numerical embodiments, is a positive meniscus lens element having the convex surface facing toward the object.

The positive lens element 21, in each of the first through tenth numerical embodiments, is a biconvex positive lens element having an aspherical surface on each lens surface thereof.

In the first numerical embodiment, the negative lens element 22 on the object side and the negative lens element 23 on the image side of the cemented lens 24 are a biconcave negative lens element 22 and a biconvex positive lens element 23, and in the second through tenth numerical embodiments, are a negative meniscus lens element 22 having the convex surface facing toward the object and a biconvex positive lens element 23.

Conventionally, it is common for a zoom lens system to be configured of a first lens group having a negative refractive power and a second lens group having a positive refractive power, in which the first lens group and the second lens group are moved along the optical axis during zooming.

In regard to increasing the angle-of-view, which is an objective of the present invention, if the first lens group (front lens group) is configured so as to have a negative lens element, a negative lens element and a positive lens element, i.e., three lens elements, field curvature, in particular, increases. Therefore, the first lens group is configured of a negative lens element, a negative lens element, a negative lens element and a positive lens element, i.e., four lens elements.

Whereas, in regard to increasing the aperture diameter and to higher pixelization, if the second lens group (rear lens group) is configured as a triplet lens having a positive lens element, a negative lens element and a positive lens element, the correcting of aberrations becomes insufficient. Hence, the second lens group is configured of four lens elements, i.e., a positive lens element, a positive lens element, a negative lens element and a positive lens element.

Condition (1) concerns the ratio of the distance along the optical axis between the most object-side surface of the first lens group G1 and the most image-side surface thereof (the sum of lens-group thickness) to the focal length of the entire zoom lens system at the short focal length extremity.

By satisfying condition (1), it becomes possible to strike a balance between a more increased angle-of-view and higher pixelization. Namely, in the zoom lens system of the present embodiments, since the radius of curvature of the two negative lens elements on the object side in the first lens group G1 is particularly small due to the inclusion of a wider angle-of-view, it is necessary to set a large thickness for the first lens group G1.

Condition (1) normalizes the sum of the lens-group thickness of the first lens group G1 with respect to the focal length at the short focal length extremity.

If the upper limit of condition (1) is exceeded, the lens-group thickness of the first lens group G1 becomes large, and the overall length of the zoom lens system at the short focal length extremity increases to the extreme. Furthermore, if the size of the zoom lens system is forcibly made smaller, the amount of peripheral illumination becomes insufficient.

If the lower limit of condition (1) is exceeded, distortion is undercorrected.

Condition (2) concerns the ratio of the traveling distance of the second lens group G2, when zooming between the short focal length extremity and the long focal length extremity is performed, to the focal length of the entire zoom lens system at the short focal length extremity.

By satisfying condition (2), it becomes possible to strike a balance between the zoom ratio and the fluctuation of aberrations. Namely, in regard to zooming, a zoom ratio of 3:1 is achieved by appropriately setting the traveling distance of the second lens group G2.

If the upper limit of condition (2) is exceeded, due to the increase in the traveling distance of the second lens group G2 during zooming, the overall length of the zoom lens system at the short focal length extremity increases to the extreme. If the size of the zoom lens system is forcibly made smaller, the amount of peripheral illumination becomes insufficient.

If the lower limit of condition (2) is exceeded, since zooming is performed by a shorter traveling distance of the second lens group G2, the fluctuation in aberrations of the various aberrations that occur during zooming, especially spherical aberration and coma, etc., increase.

Condition (3) concerns the ratio of the focal length of the first lens group to the focal length of the second lens group.

By satisfying condition (3), an appropriate power balance between the first lens group G1 and the second lens group G2 is achieved, so that extreme enlargement of the zoom lens system can be prevented and an increase in distortion can be prevented.

If the upper limit of condition (3) is exceeded, the traveling distance of the first lens group G1 during zooming increases so that the zoom lens system is enlarged by an extreme amount. If the size of the zoom lens system is forcibly made smaller, the zoom ratio and the amount of peripheral illumination become insufficient.

If the lower limit of condition (3) is exceeded, the proportion of the negative refractive power of the first lens group G1 with respect to the entire zoom lens system becomes too large, and negative distortion in particular becomes undercorrected.

Condition (4) concerns the difference in the Abbe numbers with respect to the d-line of both lens elements (12, 13) that constitute the cemented lens 14 having the negative lens element, which is the third lens element 12, counted from the object, in the first lens group G1, and the positive lens element 13, which is the fourth lens element, counted from the object, in the first lens group G1.

By satisfying condition (4), fluctuation in chromatic aberration during zooming can be reduced.

If the lower limit of condition (4) is exceeded, the fluctuation in the lateral chromatic aberrations during zooming can no longer be reduced.

Condition (5) concerns the difference in the Abbe numbers with respect to the d-line in both lens elements (22, 23) that constitute the cemented lens 24 having the negative lens element, which is the third lens element 22, counted from the object, in the second lens group G2, and the positive lens element 23, which is the fourth lens element 23, counted from the object, in the second lens group G2.

By satisfying condition (5), fluctuation in chromatic aberration during zooming can be reduced.

If the lower limit of condition (5) is exceeded, axial chromatic aberration and the fluctuation in lateral chromatic aberrations during zooming can no longer be reduced.

Condition (6) concerns the ratio of the traveling distance of the second lens group G2, when zooming between the short focal length extremity and the long focal length extremity is performed, to the focal length of the entire zoom lens system at the long focal length extremity, and to the focal length of the entire zoom lens system at the short focal length extremity.

By satisfying condition (6), it becomes possible to strike a balance between the zoom ratio and aberration fluctuations.

If the upper limit of condition (6) is exceeded, the overall length of the zoom lens system at the short focal length extremity increases, so that the zoom lens system is enlarged to the extreme, due to an increases of the traveling distance of the second lens group G2 during zooming. If the size of the zoom lens system is forcibly made smaller, the amount of peripheral illumination becomes insufficient.

If the lower limit of condition (6) is exceeded, since zooming would be carried out by a shorter traveling distance of the second lens group G2, fluctuation of aberrations of various aberration, especially spherical aberration and coma, etc., increases.

Embodiments

Specific numerical embodiments will be herein shown. The following numerical embodiments are applied to, e.g., a zoom lens system used in a compact-sized surveillance camera. In the aberration diagrams and the tables, the d-line, g-line, C-line, F-line and e-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and ν d designates the Abbe number at the d-line. The values for the f-number, the focal length, the half angle-of-view, the image height, the backfocus, the overall length of the lens system, and the distance between lenses, which changes during zooming and according to the overall length of the lens system, are shown in the following order: short focal length extremity–long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

(wherein 'c' designates the curvature (1/r), 'y' designates the distance from the optical axis, 'K' designates the conic coefficient; A4, A6, A8, . . . designate aspherical coefficients at the respective orders).

[Numerical Embodiment 1]

FIGS. 1 through 3 and Tables 1 through 4 show a first numerical embodiment of the zoom lens system according to the present invention. FIG. 1 shows the lens arrangement, FIG. 2 shows the various aberrations when focusing on an object at infinity at the short focal length extremity, and FIG. 3 shows the various aberrations when focusing on an object at infinity at the long focal length extremity. Table 1 shows the surface data, Table 2 shows the aspherical surface data, Table 3 shows various data, and Table 4 shows the zoom lens group data.

The zoom lens system of the first numerical embodiment is configured of a first lens group G1 having a negative refractive power, a diaphragm S, and a second lens group G2 having a positive refractive power.

The first lens group G1 (surface Nos. 1 through 7) is configured of, in that order from the object, a negative meniscus lens element 10 having the convex surface facing toward the object, a negative meniscus lens element 11 having the convex surface facing toward the object, and a cemented lens 14 having a biconcave negative lens element 12 and a biconvex negative lens element 13 positioned in that order from the object.

The second lens group G2 (surface Nos. 9 through 15) is configured of, in that order from the object, a positive meniscus lens element 20 having the convex surface facing toward the object, a biconvex positive lens element 21, and a cemented lens 24 having a biconcave negative lens element 22 and a biconvex positive lens element 23 positioned in that order from the object side.

The diaphragm S (surface No. 8) which is positioned in between the first lens group G1 and the second lens group G2 is stationary on the optical axis so as not to change the distance to the imaging plane I therefrom.

An optical filter OP (surface Nos. 16 and 17) is provided behind (between the imaging plane I and the second lens group G2) the second lens group G2 (cemented lens 24).

TABLE 1

Surface Data

| Surf. No. | R | d | N(d) | vd |
|---|---|---|---|---|
| 1 | 19.143 | 1.000 | 1.77250 | 49.6 |
| 2 | 10.087 | 3.644 | | |
| 3 | 31.282 | 0.900 | 1.80100 | 35.0 |
| 4 | 7.753 | 5.174 | | |
| 5 | −15.674 | 1.143 | 1.48749 | 70.2 |
| 6 | 14.423 | 2.790 | 1.84666 | 23.8 |
| 7 | −590.171 | d7 | | |
| 8 Diaphragm | ∞ | d8 | | |
| 9 | 8.751 | 3.300 | 1.61800 | 63.4 |
| 10 | 17.702 | 0.300 | | |
| 11* | 12.445 | 3.500 | 1.58636 | 60.9 |
| 12* | −17.936 | 0.500 | | |
| 13 | −96.517 | 0.900 | 1.75520 | 27.5 |
| 14 | 6.544 | 5.000 | 1.48749 | 70.2 |
| 15 | −13.706 | 1.000 | | |
| 16 | ∞ | 2.000 | 1.51633 | 64.1 |
| 17 | ∞ | — | | |

The asterisk (*) designates a rotationally symmetrical aspherical surface.

TABLE 2

Aspherical Surface Data (the aspherical surface coefficients not indicated are zero (0.00)):

| Surf. No. | K | A4 | A6 | A8 | A10 |
|---|---|---|---|---|---|
| 11 | 0.000 | −0.2635 × 10$^{-3}$ | −0.1173 × 10$^{-5}$ | −0.1748 × 10$^{-7}$ | 0.4079 × 10$^{-8}$ |
| 12 | 0.000 | 0.3330 × 10$^{-3}$ | 0.3415 × 10$^{-5}$ | −0.2685 × 10$^{-6}$ | 0.1372 × 10$^{-7}$ |

TABLE 3

VARIOUS DATA
Zoom Ratio 2.94

| | Short Focal Length Extremity | Long Focal Length Extremity |
|---|---|---|
| $F_{NO.}$ | 1.34 | 2.23 |
| f | 2.70 | 7.95 |
| W | 64.6 | 21.5 |
| Y | 3.40 | 3.40 |
| fB | 5.31 | 12.97 |
| L | 63.44 | 48.23 |
| d7 | 17.854 | 2.641 |
| d8 | 9.127 | 1.460 |

TABLE 4

ZOOM LENS GROUP DATA

| Lens Group | 1$^{st}$ Surf. | Focal Length |
|---|---|---|
| 1 | 1 | −8.00 |
| 2 | 9 | 11.69 |

[Numerical Embodiment 2]

FIGS. 4 through 6 and Tables 5 through 8 show a second numerical embodiment of the zoom lens system according to the present invention. FIG. 4 shows the lens arrangement, FIG. 5 shows the various aberrations when focusing on an object at infinity at the short focal length extremity, and FIG. 6 shows the various aberrations when focusing on an object at infinity at the long focal length extremity. Table 5 shows the surface data, Table 6 shows the aspherical surface data, Table 7 shows various data, and Table 8 shows the zoom lens group data.

The lens arrangement of the second numerical embodiment is the same as that of the first numerical embodiment except for the following two aspects:

(1) The positive lens element 13 of the cemented lens 14 of the first lens group G1 is a positive meniscus lens element having the convex surface facing toward the object.

(2) The negative lens element 22 of the cemented lens 24 of the second lens group G2 is a negative meniscus lens element having the convex surface facing toward the object.

TABLE 5

Surface Data

| Surf. No. | R | d | N(d) | vd |
|---|---|---|---|---|
| 1 | 21.751 | 1.000 | 1.83481 | 42.7 |
| 2 | 9.15 | 23.050 | | |
| 3 | 16.936 | 0.900 | 1.77250 | 49.6 |
| 4 | 6.920 | 5.130 | | |
| 5 | −16.935 | 0.800 | 1.51742 | 52.4 |
| 6 | 10.683 | 2.700 | 1.84666 | 23.8 |
| 7 | 77.268 | d7 | | |
| 8 Diaphragm | ∞ | d8 | | |

TABLE 5-continued

Surface Data

| Surf. No. | R | d | N(d) | vd |
|---|---|---|---|---|
| 9 | 8.927 | 2.140 | 1.61800 | 63.4 |
| 10 | 13.574 | 0.100 | | |
| 11* | 9.882 | 4.240 | 1.58636 | 60.9 |
| 12* | −56.301 | 0.500 | | |
| 13 | 30.088 | 0.800 | 1.84666 | 23.8 |
| 14 | 7.264 | 4.280 | 1.48749 | 70.2 |
| 15 | −12.494 | 1.000 | | |
| 16 | ∞ | 2.000 | 1.51633 | 64.1 |
| 17 | ∞ | — | | |

The asterisk (*) designates a rotationally symmetrical aspherical surface.

TABLE 6

Aspherical Surface Data (the aspherical surface coefficients not indicated are zero (0.00)):

| Surf. No. | K | A4 | A6 | A8 |
|---|---|---|---|---|
| 11 | 0.000 | $-0.1180 \times 10^{-3}$ | $0.2066 \times 10^{-5}$ | $0.5777 \times 10^{-7}$ |
| 12 | 0.000 | $0.5418 \times 10^{-3}$ | $0.4248 \times 10^{-5}$ | $0.2607 \times 10^{-6}$ |

TABLE 7

VARIOUS DATA
Zoom Ratio 2.95

| | Short Focal Length Extremity | Long Focal Length Extremity |
|---|---|---|
| $F_{NO.}$ | 1.33 | 2.41 |
| F | 2.66 | 7.85 |
| W | 65.7 | 21.8 |
| Y | 3.40 | 3.40 |
| fB | 5.94 | 14.12 |
| L | 56.67 | 46.19 |
| d7 | 12.160 | 1.680 |
| d8 | 9.932 | 1.756 |

TABLE 8

ZOOM LENS GROUP DATA

| Lens Group | 1$^{st}$ Surf. | Focal Length |
|---|---|---|
| 1 | 1 | −6.90 |
| 2 | 9 | 10.88 |

[Numerical Embodiment 3]

FIGS. 7 through 9 and Tables 9 through 12 show a third numerical embodiment of the zoom lens system according to the present invention. FIG. 7 shows the lens arrangement, FIG. 8 shows the various aberrations when focusing on an object at infinity at the short focal length extremity, and FIG. 9 shows the various aberrations when focusing on an object at infinity at the long focal length extremity. Table 9 shows the surface data, Table 10 shows the aspherical surface data, Table 11 shows various data, and Table 12 shows the zoom lens group data.

The lens arrangement of the third numerical embodiment is the same as that of the second numerical embodiment.

TABLE 9

Surface Data

| Surf. No. | R | d | N(d) | vd |
|---|---|---|---|---|
| 1 | 23.799 | 1.000 | 1.80400 | 46.6 |
| 2 | 9.066 | 3.020 | | |
| 3 | 16.832 | 0.990 | 1.77250 | 49.6 |
| 4 | 6.954 | 4.970 | | |
| 5 | −17.319 | 0.800 | 1.51742 | 52.4 |
| 6 | 10.634 | 2.710 | 1.84666 | 23.8 |
| 7 | 79.205 | d7 | | |
| 8 Diaphragm | ∞ | d8 | | |
| 9 | 9.476 | 2.050 | 1.61800 | 63.4 |
| 10 | 14.942 | 0.100 | | |
| 11* | 9.355 | 4.190 | 1.58636 | 60.9 |
| 12* | −88.878 | 0.500 | | |
| 13 | 31.041 | 0.800 | 1.84666 | 23.8 |
| 14 | 6.681 | 4.460 | 1.51823 | 59.0 |
| 15 | −13.041 | 1.000 | | |
| 16 | ∞ | 2.000 | 1.51633 | 64.1 |
| 17 | ∞ | — | | |

The asterisk (*) designates a rotationally symmetrical aspherical surface.

TABLE 10

Aspherical Surface Data (the aspherical surface coefficients not indicated are zero (0.00)):

| Surf. No. | K | A4 | A6 | A8 |
|---|---|---|---|---|
| 11 | 0.000 | $-0.5863 \times 10^{-4}$ | $0.1065 \times 10^{-5}$ | $0.8561 \times 10^{-7}$ |
| 12 | 0.000 | $0.5909 \times 10^{-3}$ | $0.2565 \times 10^{-5}$ | $0.2859 \times 10^{-6}$ |

TABLE 11

VARIOUS DATA
Zoom Ratio 2.90

| | Short Focal Length Extremity | Long Focal Length Extremity |
|---|---|---|
| $F_{NO.}$ | 1.34 | 2.42 |
| f | 2.69 | 7.80 |
| W | 65.3 | 21.9 |
| Y | 3.40 | 3.40 |
| fB | 5.96 | 13.99 |
| L | 56.30 | 46.07 |
| d7 | 12.132 | 1.909 |
| d8 | 9.614 | 1.582 |

TABLE 12

ZOOM LENS GROUP DATA

| Lens Group | 1$^{st}$ Surf. | Focal Length |
|---|---|---|
| 1 | 1 | −6.91 |
| 2 | 9 | 10.86 |

[Numerical Embodiment 4]

FIGS. 10 through 12 and Tables 13 through 16 show a fourth numerical embodiment of the zoom lens system according to the present invention. FIG. 10 shows the lens arrangement, FIG. 11 shows the various aberrations when focusing on an object at infinity at the short focal length extremity, and FIG. 12 shows the various aberrations when focusing on an object at infinity at the long focal length extremity. Table 13 shows the surface data, Table 14 shows the aspherical surface data, Table 15 shows various data, and Table 16 shows the zoom lens group data.

The lens arrangement of the fourth numerical embodiment is the same as that of the second numerical embodiment.

TABLE 13

Surface Data

| Surf. No. | R | d | N(d) | vd |
|---|---|---|---|---|
| 1 | 24.033 | 1.000 | 1.80400 | 46.6 |
| 2 | 9.069 | 2.940 | | |
| 3 | 16.920 | 0.900 | 1.80400 | 46.6 |
| 4 | 7.010 | 4.980 | | |
| 5 | −17.008 | 0.800 | 1.51742 | 52.4 |
| 6 | 10.842 | 2.710 | 1.84666 | 23.8 |
| 7 | 100.820 | d7 | | |
| 8 Diaphragm | ∞ | d8 | | |
| 9 | 9.414 | 2.080 | 1.61800 | 63.4 |
| 10 | 14.800 | 0.100 | | |
| 11* | 9.587 | 4.130 | 1.58636 | 60.9 |
| 12* | −55.852 | 0.500 | | |
| 13 | 27.555 | 0.800 | 1.84666 | 23.8 |
| 14 | 6.162 | 4.550 | 1.51742 | 52.4 |
| 15 | −13.905 | 1.000 | | |
| 16 | ∞ | 2.000 | 1.51633 | 64.1 |
| 17 | ∞ | — | | |

The asterisk (*) designates a rotationally symmetrical aspherical surface.

TABLE 14

Aspherical Surface Data (the aspherical surface coefficients not indicated are zero (0.00)):

| Surf. No. | K | A4 | A6 | A8 |
|---|---|---|---|---|
| 11 | 0.000 | $-0.1074 \times 10^{-3}$ | $0.2179 \times 10^{-6}$ | $0.6344 \times 10^{-7}$ |
| 12 | 0.000 | $0.4700 \times 10^{-3}$ | $0.1434 \times 10^{-5}$ | $0.1528 \times 10^{-6}$ |

TABLE 15

VARIOUS DATA
Zoom Ratio 2.98

| | Short Focal Length Extremity | Long Focal Length Extremity |
|---|---|---|
| $F_{NO.}$ | 1.34 | 2.46 |
| f | 2.65 | 7.90 |
| W | 66.5 | 21.7 |
| Y | 3.40 | 3.40 |
| fB | 5.84 | 14.09 |
| L | 56.56 | 45.96 |
| d7 | 12.549 | 1.946 |
| d8 | 9.677 | 1.431 |

TABLE 16

ZOOM LENS GROUP DATA

| Lens Group | 1$^{st}$ Surf. | Focal Length |
|---|---|---|
| 1 | 1 | −6.92 |
| 2 | 9 | 10.87 |

[Numerical Embodiment 5]

FIGS. 13 through 15 and Tables 17 through 20 show a fifth numerical embodiment of the zoom lens system according to the present invention. FIG. 13 shows the lens arrangement, FIG. 14 shows the various aberrations when focusing on an object at infinity at the short focal length extremity, and FIG. 15 shows the various aberrations when focusing on an object at infinity at the long focal length extremity. Table 17 shows the surface data, Table 18 shows the aspherical surface data, Table 19 shows various data, and Table 20 shows the zoom lens group data.

The lens arrangement of the fifth numerical embodiment is the same as that of the second numerical embodiment.

TABLE 17

Surface Data

| Surf. No. | R | d | N(d) | vd |
|---|---|---|---|---|
| 1 | 22.834 | 1.000 | 1.83400 | 37.2 |
| 2 | 9.471 | 3.080 | | |
| 3 | 16.900 | 0.900 | 1.69680 | 55.5 |
| 4 | 6.738 | 5.210 | | |
| 5 | −16.000 | 0.800 | 1.49700 | 81.6 |
| 6 | 10.330 | 2.700 | 1.80518 | 25.4 |
| 7 | 62.650 | d7 | | |
| 8 Diaphragm | ∞ | d8 | | |
| 9 | 9.600 | 2.050 | 1.48749 | 70.2 |
| 10 | 14.630 | 0.100 | | |
| 11* | 8.780 | 4.770 | 1.58913 | 61.2 |
| 12* | −29.643 | 0.150 | | |
| 13 | 22.253 | 0.800 | 1.80518 | 25.4 |
| 14 | 5.310 | 5.300 | 1.51742 | 52.4 |
| 15 | −21.500 | 1.000 | | |
| 16 | ∞ | 2.000 | 1.51633 | 64.1 |
| 17 | ∞ | — | | |

The asterisk (*) designates a rotationally symmetrical aspherical surface.

TABLE 18

Aspherical Surface Data (the aspherical surface coefficients not indicated are zero (0.00)):

| Surf. No. | K | A4 | A6 | A8 | A10 |
|---|---|---|---|---|---|
| 11 | 0.000 | $-0.2500 \times 10^{-3}$ | $0.4040 \times 10^{-5}$ | $-0.2470 \times 10^{-6}$ | $0.3600 \times 10^{-8}$ |
| 12 | 0.000 | $0.2460 \times 10^{-3}$ | $0.6020 \times 10^{-5}$ | $-0.4200 \times 10^{-6}$ | $0.8320 \times 10^{-8}$ |

TABLE 19

VARIOUS DATA
Zoom Ratio 2.97

|  | Short Focal Length Extremity | Long Focal Length Extremity |
|---|---|---|
| $F_{NO.}$ | 1.34 | 2.48 |
| f | 2.64 | 7.85 |
| W | 67.0 | 21.8 |
| Y | 3.40 | 3.40 |
| fB | 5.10 | 13.20 |
| L | 56.75 | 46.51 |
| d7 | 12.706 | 2.470 |
| d8 | 9.075 | 0.984 |

TABLE 20

ZOOM LENS GROUP DATA

| Lens Group | 1$^{st}$ Surf. | Focal Length |
|---|---|---|
| 1 | 1 | −6.85 |
| 2 | 9 | 10.64 |

[Numerical Embodiment 6]

FIGS. 16 through 18 and Tables 21 through 24 show a sixth numerical embodiment of the zoom lens system according to the present invention. FIG. 16 shows the lens arrangement, FIG. 17 shows the various aberrations when focusing on an object at infinity at the short focal length extremity, and FIG. 18 shows the various aberrations when focusing on an object at infinity at the long focal length extremity. Table 21 shows the surface data, Table 22 shows the aspherical surface data, Table 23 shows various data, and Table 24 shows the zoom lens group data.

The lens arrangement of the sixth numerical embodiment is the same as that of the second numerical embodiment.

TABLE 21

Surface Data

| Surf. No. | R | d | N(d) | νd |
|---|---|---|---|---|
| 1 | 22.834 | 1.000 | 1.83400 | 37.2 |
| 2 | 9.471 | 3.080 | | |
| 3 | 16.900 | 0.900 | 1.69680 | 55.5 |
| 4 | 6.738 | 5.210 | | |
| 5 | −16.000 | 0.800 | 1.49700 | 81.6 |
| 6 | 10.330 | 2.700 | 1.80518 | 25.4 |
| 7 | 62.650 | d7 | | |
| 8 Diaphragm | ∞ | d8 | | |
| 9 | 9.600 | 2.000 | 1.48749 | 70.2 |
| 10 | 14.630 | 0.100 | | |
| 11* | 8.773 | 4.770 | 1.58913 | 61.2 |
| 12* | −29.637 | 0.150 | | |
| 13 | 22.253 | 0.800 | 1.80518 | 25.4 |
| 14 | 5.285 | 5.090 | 1.51742 | 52.4 |
| 15 | −21.083 | 1.000 | | |
| 16 | ∞ | 2.000 | 1.51633 | 64.1 |
| 17 | ∞ | — | | |

The asterisk (*) designates a rotationally symmetrical aspherical surface.

TABLE 22

Aspherical Surface Data (the aspherical surface coefficients not indicated are zero (0.00)):

| Surf. No. | K | A4 | A6 | A8 | A10 |
|---|---|---|---|---|---|
| 11 | 0.000 | −0.2500 × 10$^{−3}$ | 0.3970 × 10$^{−5}$ | −0.2450 × 10$^{−6}$ | 0.3620 × 10$^{−8}$ |
| 12 | 0.000 | 0.2460 × 10$^{−3}$ | 0.6100 × 10$^{−5}$ | −0.4220 × 10$^{−6}$ | 0.8350 × 10$^{−8}$ |

TABLE 23

VARIOUS DATA
Zoom Ratio 3.15

|  | Short Focal Length Extremity | Long Focal Length Extremity |
|---|---|---|
| $F_{NO.}$ | 1.34 | 2.67 |
| f | 2.67 | 8.40 |
| W | 66.2 | 20.4 |
| Y | 3.40 | 3.40 |
| fB | 5.26 | 14.12 |
| L | 56.19 | 46.51 |
| d7 | 11.840 | 2.159 |
| d8 | 9.491 | 0.634 |

TABLE 24

ZOOM LENS GROUP DATA

| Lens Group | 1$^{st}$ Surf. | Focal Length |
|---|---|---|
| 1 | 1 | −6.85 |
| 2 | 9 | 10.59 |

[Numerical Embodiment 7]

FIGS. 19 through 21 and Tables 25 through 28 show a seventh numerical embodiment of the zoom lens system according to the present invention. FIG. 19 shows the lens arrangement, FIG. 20 shows the various aberrations when focusing on an object at infinity at the short focal length extremity, and FIG. 21 shows the various aberrations when focusing on an object at infinity at the long focal length extremity. Table 25 shows the surface data, Table 26 shows the aspherical surface data, Table 27 shows various data, and Table 28 shows the zoom lens group data.

The lens arrangement of the seventh numerical embodiment is the same as that of the second numerical embodiment.

TABLE 25

Surface Data

| Surf. No. | R | d | N(d) | νd |
|---|---|---|---|---|
| 1 | 25.064 | 1.000 | 1.83400 | 37.2 |
| 2 | 9.763 | 3.890 | | |
| 3 | 16.614 | 0.900 | 1.72916 | 54.7 |
| 4 | 6.818 | 4.820 | | |
| 5 | −16.256 | 0.800 | 1.49700 | 81.6 |
| 6 | 10.447 | 2.730 | 1.80518 | 25.4 |
| 7 | 78.000 | d7 | | |
| 8 Diaphragm | ∞ | d8 | | |
| 9 | 8.873 | 2.000 | 1.48749 | 70.2 |
| 10 | 12.947 | 0.100 | | |
| 11* | 8.788 | 4.620 | 1.58913 | 61.2 |
| 12* | −34.459 | 0.100 | | |
| 13 | 23.440 | 0.890 | 1.80518 | 25.4 |
| 14 | 5.285 | 4.750 | 1.51742 | 52.4 |
| 15 | −18.414 | 1.000 | | |

TABLE 25-continued

Surface Data

| Surf. No. | R | d | N(d) | νd |
|---|---|---|---|---|
| 16 | ∞ | 2.000 | 1.51633 | 64.1 |
| 17 | ∞ | — | | |

The asterisk (*) designates a rotationally symmetrical aspherical surface.

TABLE 26

Aspherical Surface Data (the aspherical surface coefficients not indicated are zero (0.00)):

| Surf. No. | K | A4 | A6 | A8 |
|---|---|---|---|---|
| 11 | 0.000 | $-0.2312 \times 10^{-3}$ | $-0.1240 \times 10^{-5}$ | $-0.2450 \times 10^{-7}$ |
| 12 | 0.000 | $0.2924 \times 10^{-3}$ | $-0.2150 \times 10^{-5}$ | $0.2170 \times 10^{-7}$ |

TABLE 27

VARIOUS DATA
Zoom Ratio 3.35

| | Short Focal Length Extremity | Long Focal Length Extremity |
|---|---|---|
| $F_{NO.}$ | 1.34 | 2.74 |
| f | 2.69 | 9.00 |
| W | 65.6 | 19.0 |
| Y | 3.40 | 3.40 |
| FB | 5.70 | 15.52 |
| L | 56.76 | 47.35 |
| d7 | 10.837 | 1.433 |
| d8 | 10.618 | 0.800 |

TABLE 28

ZOOM LENS GROUP DATA

| Lens Group | 1st Surf. | Focal Length |
|---|---|---|
| 1 | 1 | -6.89 |
| 2 | 9 | 10.71 |

[Numerical Embodiment 8]

FIGS. 22 through 24 and Tables 29 through 32 show an eighth numerical embodiment of the zoom lens system according to the present invention. FIG. 22 shows the lens arrangement, FIG. 23 shows the various aberrations when focusing on an object at infinity at the short focal length extremity, and FIG. 24 shows the various aberrations when focusing on an object at infinity at the long focal length extremity. Table 29 shows the surface data, Table 30 shows the aspherical surface data, Table 31 shows various data, and Table 32 shows the zoom lens group data.

The lens arrangement of the eighth numerical embodiment is the same as that of the second numerical embodiment.

TABLE 29

Surface Data

| Surf. No. | R | d | N(d) | νd |
|---|---|---|---|---|
| 1 | 29.787 | 1.600 | 1.80400 | 46.6 |
| 2 | 9.970 | 2.762 | | |
| 3 | 19.132 | 1.400 | 1.80400 | 46.6 |
| 4 | 7.441 | 5.162 | | |

TABLE 29-continued

Surface Data

| Surf. No. | R | d | N(d) | νd |
|---|---|---|---|---|
| 5 | -19.880 | 1.200 | 1.51742 | 52.4 |
| 6 | 11.956 | 3.000 | 1.84666 | 23.8 |
| 7 | 125.558 | d7 | | |
| 8 Diaphragm | ∞ | d8 | | |
| 9 | 9.378 | 2.080 | 1.61800 | 63.4 |
| 10 | 17.654 | 0.100 | | |
| 11* | 10.238 | 4.130 | 1.58636 | 60.9 |
| 12* | -54.632 | 0.500 | | |
| 13 | 26.672 | 0.800 | 1.84666 | 23.8 |
| 14 | 5.943 | 4.550 | 1.51742 | 52.4 |
| 15 | -13.544 | 1.000 | | |
| 16 | ∞ | 2.000 | 1.51633 | 64.1 |
| 17 | ∞ | — | | |

TABLE 30

Aspherical Surface Data (the aspherical surface coefficients not indicated are zero (0.00)):

| Surf. No. | K | A4 | A6 | A8 |
|---|---|---|---|---|
| 11 | 0.000 | $-0.1385 \times 10^{-3}$ | $-0.3125 \times 10^{-7}$ | $0.6535 \times 10^{-7}$ |
| 12 | 0.000 | $0.4360 \times 10^{-3}$ | $-0.3903 \times 10^{-6}$ | $0.1935 \times 10^{-6}$ |

TABLE 31

VARIOUS DATA
Zoom Ratio 2.98

| | Short Focal Length Extremity | Long Focal Length Extremity |
|---|---|---|
| $F_{NO.}$ | 1.34 | 2.34 |
| f | 2.65 | 7.90 |
| W | 67.5 | 21.7 |
| Y | 3.00 | 3.00 |
| fB | 5.13 | 12.57 |
| L | 57.50 | 45.07 |
| d7 | 13.456 | 1.024 |
| d8 | 8.628 | 1.187 |

TABLE 32

ZOOM LENS GROUP DATA

| Lens Group | 1st Surf. | Focal Length |
|---|---|---|
| 1 | 1 | -7.48 |
| 2 | 9 | 10.60 |

[Numerical Embodiment 9]

FIGS. 25 through 27 and Tables 33 through 36 show an eighth numerical embodiment of the zoom lens system according to the present invention. FIG. 25 shows the lens arrangement, FIG. 26 shows the various aberrations when focusing on an object at infinity at the short focal length extremity, and FIG. 27 shows the various aberrations when focusing on an object at infinity at the long focal length extremity. Table 33 shows the surface data, Table 34 shows the aspherical surface data, Table 35 shows various data, and Table 36 shows the zoom lens group data.

The lens arrangement of the ninth numerical embodiment is the same as that of the second numerical embodiment.

TABLE 33

Surface Data

| Surf. No. | R | d | N(d) | νd |
|---|---|---|---|---|
| 1 | 43.309 | 1.200 | 1.80400 | 46.6 |
| 2 | 8.950 | 3.319 | | |
| 3 | 37.84 | 1.200 | 1.77250 | 49.6 |
| 4 | 7.924 | 4.229 | | |
| 5 | −43.379 | 1.000 | 1.53172 | 48.9 |
| 6 | 9.870 | 2.710 | 1.84666 | 23.8 |
| 7 | 70.819 | d7 | | |
| 8 Diaphragm | ∞ | d8 | | |
| 9 | 9.620 | 2.120 | 1.61800 | 63.4 |
| 10 | 13.822 | 0.100 | | |
| 11* | 9.984 | 4.080 | 1.58636 | 60.9 |
| 12* | −57.314 | 0.500 | | |
| 13 | 26.724 | 1.000 | 1.84666 | 23.8 |
| 14 | 6.116 | 4.580 | 1.51742 | 52.4 |
| 15 | −13.144 | 1.000 | | |
| 16 | ∞ | 2.000 | 1.51633 | 64.1 |
| 17 | ∞ | — | | |

TABLE 34

Aspherical Surface Data (the aspherical surface coefficients not indicated are zero (0.00)):

| Surf. No. | K | A4 | A6 | A8 |
|---|---|---|---|---|
| 11 | 0.000 | $-0.1280 \times 10^{-3}$ | $-0.4265 \times 10^{-5}$ | $0.9395 \times 10^{-7}$ |
| 12 | 0.000 | $0.3421 \times 10^{-3}$ | $-0.5230 \times 10^{-5}$ | $0.1620 \times 10^{-6}$ |

TABLE 35

VARIOUS DATA
Zoom Ratio 2.98

| | Short Focal Length Extremity | Long Focal Length Extremity |
|---|---|---|
| $F_{NO.}$ | 1.34 | 2.59 |
| f | 2.65 | 7.90 |
| W | 70.7 | 21.8 |
| Y | 3.00 | 3.00 |
| FB | 6.77 | 15.82 |
| L | 57.50 | 47.80 |
| d7 | 11.641 | 1.944 |
| d8 | 10.054 | 1.003 |

TABLE 36

ZOOM LENS GROUP DATA

| Lens Group | 1st Surf. | Focal Length |
|---|---|---|
| 1 | 1 | −6.59 |
| 2 | 9 | 11.35 |

[Numerical Embodiment 10]

FIGS. 28 through 30 and Tables 37 through 40 show an eighth numerical embodiment of the zoom lens system according to the present invention. FIG. 28 shows the lens arrangement, FIG. 29 shows the various aberrations when focusing on an object at infinity at the short focal length extremity, and FIG. 30 shows the various aberrations when focusing on an object at infinity at the long focal length extremity. Table 37 shows the surface data, Table 38 shows the aspherical surface data, Table 39 shows various data, and Table 40 shows the zoom lens group data.

The lens arrangement of the tenth numerical embodiment is the same as that of the second numerical embodiment.

TABLE 37

Surface Data

| Surf. No. | R | d | N(d) | νd |
|---|---|---|---|---|
| 1 | 24.654 | 1.200 | 1.83481 | 42.7 |
| 2 | 9.441 | 3.074 | | |
| 3 | 18.609 | 1.000 | 1.80400 | 46.6 |
| 4 | 7.518 | 4.994 | | |
| 5 | −18.751 | 1.000 | 1.51742 | 52.4 |
| 6 | 11.751 | 4.200 | 1.84666 | 23.8 |
| 7 | 167.356 | d7 | | |
| 8 Diaphragm | ∞ | d8 | | |
| 9 | 9.192 | 2.079 | 1.61800 | 63.4 |
| 10 | 18.352 | 0.100 | | |
| 11* | 11.871 | 4.117 | 1.58636 | 60.9 |
| 12* | −61.850 | 0.500 | | |
| 13 | 23.483 | 0.791 | 1.84666 | 23.8 |
| 14 | 5.984 | 4.468 | 1.51742 | 52.4 |
| 15 | −13.513 | 1.000 | | |
| 16 | ∞ | 2.000 | 1.51633 | 64.1 |
| 17 | ∞ | — | | |

TABLE 38

Aspherical Surface Data (the aspherical surface coefficients not indicated are zero (0.00)):

| Surf. No. | K | A4 | A6 | A8 |
|---|---|---|---|---|
| 11 | 0.000 | $-0.1701 \times 10^{-3}$ | $-0.1418 \times 10^{-5}$ | $0.5811 \times 10^{-7}$ |
| 12 | 0.000 | $0.3248 \times 10^{-3}$ | $-0.1827 \times 10^{-5}$ | $0.1437 \times 10^{-6}$ |

TABLE 39

VARIOUS DATA
Zoom Ratio 2.98

| | Short Focal Length Extremity | Long Focal Length Extremity |
|---|---|---|
| $F_{NO.}$ | 1.34 | 2.33 |
| f | 2.65 | 7.90 |
| W | 66.2 | 21.6 |
| Y | 3.00 | 3.00 |
| fB | 5.53 | 13.03 |
| L | 58.50 | 45.56 |
| d7 | 13.951 | 1.009 |
| d8 | 8.499 | 0.999 |

TABLE 40

ZOOM LENS GROUP DATA

| Lens Group | 1st Surf. | Focal Length |
|---|---|---|
| 1 | 1 | −7.55 |
| 2 | 9 | 10.79 |

The values of each condition of each numerical embodiment are shown in Table 41.

TABLE 41

| | Embod. 1 | Embod. 2 | Embod. 3 | Embod. 4 |
|---|---|---|---|---|
| Cond. (1) | 5.43 | 5.11 | 5.01 | 5.03 |
| Cond. (2) | 2.84 | 3.07 | 2.99 | 3.11 |
| Cond. (3) | 0.68 | 0.63 | 0.64 | 0.64 |
| Cond. (4) | 46.4 | 28.6 | 28.6 | 28.6 |
| Cond. (5) | 42.7 | 46.4 | 35.2 | 28.6 |
| Cond. (6) | 2.60 | 2.77 | 2.77 | 2.77 |

TABLE 41-continued

|  | Embod. 5 | Embod. 6 | Embod. 7 | Embod. 8 |
|---|---|---|---|---|
| Cond. (1) | 5.19 | 5.13 | 5.26 | 5.71 |
| Cond. (2) | 3.06 | 3.32 | 3.65 | 2.81 |
| Cond. (3) | 0.64 | 0.65 | 0.64 | 0.71 |
| Cond. (4) | 56.2 | 56.2 | 56.2 | 28.6 |
| Cond. (5) | 27.0 | 27.0 | 27.0 | 28.6 |
| Cond. (6) | 2.72 | 2.82 | 2.93 | 2.50 |

|  | Embod. 9 | Embod. 10 |
|---|---|---|
| Cond. (1) | 5.15 | 5.84 |
| Cond. (2) | 3.42 | 2.83 |
| Cond. (3) | 0.58 | 0.70 |
| Cond. (4) | 25.1 | 28.6 |
| Cond. (5) | 28.6 | 28.6 |
| Cond. (6) | 3.04 | 2.52 |

As can be understood from Table 41, the first through tenth embodiments satisfy conditions (1) through (6). Furthermore, as can be understood from the aberration diagrams, the various aberrations are suitably corrected.

INDUSTRIAL APPLICABILITY

The zoom lens system of the present invention has a fast f-number of approximately 1.3 at the short focal length extremity, has a wide half angle-of-view of approximately 75 degrees, can achieve a zoom ratio of approximately 3:1 that is adaptable for high pixelization, and can achieve both a high zoom ratio and a wide angle-of-view.

REFERENCE SIGNS LIST

| G1 | First lens group having a negative refractive power |
|---|---|
| G2 | Second lens group having a positive refractive power |
| 10 | Negative lens element |
| 11 | Negative lens element |
| 12 | Negative lens element |
| 13 | Positive lens element |
| 14 | Cemented lens |
| 20 | Positive lens element |
| 21 | Positive lens element |
| 22 | Negative lens element |
| 23 | Positive lens element |
| 24 | Cemented lens |
| S | Diaphragm |
| I | Imaging plane |
| OP | Optical filter |

The invention claimed is:

1. A zoom lens system comprises a first lens group, having a negative refractive power, a diaphragm, and a second lens group, having a positive refractive power, in that order from an object,
wherein the first lens group and the second lens group move in the optical axis direction so that the distance between the first lens group and the second lens group decreases upon zooming from the short focal length extremity to the long focal length extremity;
wherein the first lens group includes a negative lens element, a negative lens element, a negative lens element, and a positive lens element, in that order from the object,
wherein the second lens group includes a positive lens element, a positive lens element, a negative lens element, and a positive lens element, in that order from the object; and
wherein the following conditions (1) and (2) are satisfied:

$$4.8 < \Sigma 1G/fw < 6.0 \qquad (1), \text{ and}$$

$$2.8 < \Delta X2G/fw < 4.0 \qquad (2),$$

wherein
$\Sigma 1G$ designates the distance on the optical axis from the most object-side surface of the first lens group to the most image-side surface thereof,
fw designates the focal length of the entire zoom lens system at the short focal length extremity, and
$\Delta X2G$ designates the traveling distance of the second lens group when zooming between the short focal length extremity and the long focal length extremity is performed.

2. The zoom lens system according to claim 1, wherein the following condition (3) is satisfied:

$$0.5 < |f1G/f2G| < 0.8 \qquad (3),$$

wherein
f1G designates the focal length of the first lens group, and
f2G designates the focal length of the second lens group.

3. The zoom lens system according to claim 1, wherein the diaphragm is provided at a stationary position on the optical axis, and the distance from the diaphragm to the imaging plane does not change during zooming.

4. The zoom lens system according to claim 1, wherein the negative third lens element, counted from the object, of the first lens group and the positive fourth lens element, counted from the object, of the first lens group constitutes a cemented lens, and
wherein the following condition (4) is satisfied:

$$25 < vN1G - vP1G \qquad (4),$$

wherein
vN1G designates the Abbe number with respect to the d-line of the negative lens element in the cemented lens of the first lens group, and
vP1G designates the Abbe number with respect to the d-line of the positive lens element in the cemented lens of the first lens group.

5. The zoom lens system according to claim 1, wherein the negative third lens element, counted from the object, of the second lens group and the positive fourth lens element, counted from the object, of the second lens group constitutes a cemented lens, and
wherein the following condition (5) is satisfied:

$$25 < vP2G - vN2G \qquad (5)$$

wherein
vP2G designates the Abbe number with respect to the d-line of the positive lens element in the cemented lens of the second lens group, and
vN2G designates the Abbe number with respect to the d-line of the negative lens element in the cemented lens of the second lens group.

6. A zoom lens system comprises a first lens group, having a negative refractive power, a diaphragm, and a second lens group, having a positive refractive power, in that order from the object side,
wherein the first lens group and the second lens group move in the optical axis direction so that the distance between the first lens group and the second lens group decreases upon zooming from the short focal length extremity to the long focal length extremity;
wherein the first lens group includes a negative lens element, a negative lens element, a negative lens element, and a positive lens element, in that order from the object side;
wherein the second lens group includes a positive lens element, a positive lens element, a negative lens element, and a positive lens element, in that order from the object side; and wherein the following conditions (1) and (6) are satisfied:

$$4.8 < \Sigma 1G/fw < 6.0 \quad (1), \text{ and}$$

$$2.2 < \Delta X2G/(ft/fw) < 3.2 \quad (6),$$

wherein $\Sigma 1G$ designates the distance on the optical axis from the most object-side surface of the first lens group to the most image-side surface thereof, fw designates the focal length (mm) of the entire zoom lens system at the short focal length extremity, and $\Delta X2G$ designates the traveling distance (mm) of the second lens group when zooming between the short focal length extremity and the long focal length extremity is performed, and ft designates the focal length (mm) of the entire zoom lens system at the long focal length extremity.

7. The zoom lens system according to claim 6, wherein the following condition (3) is satisfied:

$$0.5 < |f1G/f2G| < 0.8 \quad (3), \text{ wherein}$$

f1G designates the focal length of the first lens group, and f2G designates the focal length of the second lens group.

8. The zoom lens system according to claim 6, wherein the diaphragm is provided at a stationary position on the optical axis, and the distance from the diaphragm to the imaging plane does not change during zooming.

9. The zoom lens system according to claim 6, wherein the negative third lens element, counted from the object, of the first lens group and the positive fourth lens element, counted from the object, of the first lens group constitutes a cemented lens; and wherein the following condition (4) is satisfied:

$$25 < vN1G - vP1G \quad (4),$$

wherein vN1G designates the Abbe number with respect to the d-line of the negative lens element in the cemented lens of the first lens group, and vP1G designates the Abbe number with respect to the d-line of the positive lens element in the cemented lens of the first lens group.

10. The zoom lens system according to claim 6, wherein the negative third lens element, counted from the object, of the second lens group and the positive fourth lens element, counted from the object, of the second lens group constitutes a cemented lens; and wherein the following condition (5) is satisfied:

$$25 < vP2G - vN2G \quad (5),$$

wherein vP2G designates the Abbe number with respect to the d-line of the positive lens element in the cemented lens of the second lens group, and vN2G designates the Abbe number with respect to the d-line of the negative lens element in the cemented lens of the second lens group.

* * * * *